(12) United States Patent
Kim

(10) Patent No.: US 9,319,366 B2
(45) Date of Patent: Apr. 19, 2016

(54) DIGITAL DEVICE FOR PROVIDING TEXT MESSAGING SERVICE AND METHOD FOR CONTROLLING THE SAME

(71) Applicant: LG ELECTRONICS INC., Seoul (KR)

(72) Inventor: Jihyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 13/777,457

(22) Filed: Feb. 26, 2013

(65) Prior Publication Data

US 2014/0173460 A1 Jun. 19, 2014

(30) Foreign Application Priority Data

Dec. 14, 2012 (KR) ........................ 10-2012-0146160

(51) Int. Cl.
*H04L 12/58* (2006.01)
*G06F 3/048* (2013.01)

(52) U.S. Cl.
CPC ................ *H04L 51/18* (2013.01); *G06F 3/048* (2013.01)

(58) Field of Classification Search
CPC .............................. G06F 3/048; H04L 12/58
See application file for complete search history.

(56) References Cited

U.S. PATENT DOCUMENTS

| 7,634,556 | B2 | 12/2009 | Huynh et al. |
| 2010/0088598 | A1* | 4/2010 | Lee ..................... G06F 3/04817 715/704 |
| 2010/0261489 | A1 | 10/2010 | Almodovar Herraiz et al. |
| 2012/0287067 | A1* | 11/2012 | Ikegami ....................... 345/173 |
| 2013/0297317 | A1* | 11/2013 | Lee et al. ................... 704/270.1 |

* cited by examiner

*Primary Examiner* — Andrea Leggett
(74) *Attorney, Agent, or Firm* — Birch, Stewart, Kolasch & Birch, LLP

(57) ABSTRACT

The present disclosure relates to a digital device and a method for controlling the same, which displays an application related to a text message, extracts additional information from the application and inserts the extracted additional information to the text message, in order to provide additional information associated with a text message.

21 Claims, 15 Drawing Sheets

(a)                    (b)

DIGITAL DEVICE FOR PROVIDING TEXT MESSAGING SERVICE AND METHOD FOR CONTROLLING THE SAME

Pursuant to 35 U.S.C. §119(a), this application claims the benefit of the Korean Patent Application No. 10-2012-0146160, filed on Dec. 14, 2012, which is hereby incorporated by reference as if fully set forth herein.

BACKGROUND OF THE INVENTION

1. Field of the Invention

The present disclosure relates to a digital device for providing a text messaging service and a method for controlling the same. And, most particularly, the present disclosure relates to a digital device and a method for controlling the same, which displays an application related to a text message, extracts additional information from the application and inserts the extracted additional information to the text message, in order to provide additional information associated with a text message.

2. Discussion of the Related Art

With the evolution in mobile telephony devices (i.e., mobile phones) and with the introduction of diverse types of portable devices, communication between users by using text messages is increasing at a vast rate.

Most particularly, in addition to mobile phones, by having a wider range of other types of digital devices provide text messaging services as well, the user is now capable of more easily transceiving (i.e., transmitting and receiving) text message by using a variety of methods.

Moreover, by using Multimedia Message Service (MMS), Instant Messaging (IM), and so on, digital devices may provide the users with an environment enabling the users to transmit and receive diverse forms of data, such as still images, music, moving pictures, and so on, in addition to text messages.

However, despite the convenience that diverse form of data can be transmitted and received, the user may only be capable of transmitting and receiving manually designated or predetermined forms of data, thereby causing inconvenience to the user.

Additionally, with respect to already received text messages, if the user wishes to receive (or acquire) additional information on the corresponding text message, the user is required to undergo the inconvenience of having to search the wanted additional information by using a separate search means in order to gain the additional information he (or she) wishes.

Furthermore, even if the user searches the wanted additional information on the received message by using a separate search means in order to gain additional information on the corresponding message, a wide range of related additional information is found without taking into consideration the relation between the transmitter and the receiver. Accordingly, the user is required to undergo the inconvenience of searching for the wanted additional information within the list of searched result.

SUMMARY OF THE INVENTION

Accordingly, the present disclosure is directed to a digital device for providing a text messaging service and a method for controlling the same that substantially obviate one or more problems due to limitations and disadvantages of the related art.

An object of the present disclosure is to provide a digital device for providing a text messaging service and a method for controlling the same that can acquire additional information related to a text message within a text messaging interface.

Another object of the present disclosure is to provide a text messaging interface that can automatically supply (or add) additional information related to a text message.

Yet another object of the present disclosure is to provide a text messaging interface that can insert and store additional information, even for already received text messages in addition to text messages that are currently being written by the user.

Yet another object of the present disclosure is to provide a text messaging interface that can insert additional information according to the user's intentions based on the relation between the transmitter and the receiver of the respective text message.

A further object of the present disclosure is to provide text messaging interface that can vary the additional information to be inserted in the text message according to the respective transmitting device and receiving device, even if the additional information is extracted from the same type of application.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a digital device providing a text messaging service includes a display unit configured to display a text messaging interface, a sensor unit configured to sense a user input inputted to the digital device and delivering an input signal according to a sensed result to a processor, a communication unit configured to transmit and receive text messages to and from an external device, and the processor configured to control the display unit, the sensor unit, and the communication unit. Herein, the processor may designate at least one word included in the text message as a text block, wherein the text message is displayed through the text messaging interface, may extract at least one application providing additional information associated with the text block, may display an application interface including at least one icon representing the at least one application, may detect a first input signal to the at least one icon in the application interface, and may insert additional information to the text message, wherein the additional information is provided by an application corresponding to an icon from which the first input signal is detected.

According to another aspect of the present disclosure, a digital device providing a text messaging service includes a display unit configured to display a text messaging interface, a sensor unit configured to sense a user input inputted to the digital device and delivering an input signal according to a sensed result to a processor, a communication unit configured to transmit and receive data to and from an external device, and the processor configured to control the display unit, the sensor unit, and the communication unit. Herein, the processor may receive a message file including a text message and metadata related to the text message from the external device, wherein the metadata may include link information for providing additional information associated with at least one word included in the text message, may designate the at least one word as a text block, wherein the at least one word is related to the link information, may display the text message through the text messaging interface, and may add a graphic effect to the text block.

According to yet another aspect of the present disclosure, a method for controlling a digital device providing a text messaging service includes the steps of displaying a text message through a text messaging interface, designating at least one word included in the text message as a text block, wherein the text message may be displayed through the text messaging interface, extracting at least one application providing additional information associated with the text block, displaying an application interface including at least one icon representing the at least one application, detecting a first input signal to the at least one icon in the application interface, and inserting additional information to the text message, wherein the additional information may be provided by an application corresponding to an icon from which the first input signal is detected.

According to a further aspect of the present disclosure, a method for controlling a digital device providing a text messaging service may include the steps of receiving a message file including a text message and metadata related to the text message from an external device, wherein the metadata may include link information for providing additional information associated with at least one word included in the text message, designating the at least one word as a text block, wherein the at least one word is related to the link information, and displaying the text message through the text messaging interface, wherein, in the step of displaying the text message, a graphic effect may be added to the text block.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE INVENTION

Although the terms used in the present disclosure are selected from generally known and used terms, the terms used herein may be varied or modified in accordance with the intentions or practice of anyone skilled in the art, or along with the advent of a new technology. Alternatively, in some particular cases, some of the terms mentioned in the description of the present disclosure may be selected by the applicant at his or her discretion, the detailed meanings of which are described in relevant parts of the description herein. Furthermore, it is required that the present disclosure is understood not simply by the actual terms used but by the meaning of each term lying within.

Additionally, reference will now be made in detail to the preferred embodiments of the present disclosure, examples of which are illustrated in the accompanying drawings. However, the description of the present disclosure will not be limited only to the exemplary embodiments presented herein.

The digital device according to the embodiment of the present disclosure corresponds to a device that can provide text messaging services. Herein, a digital device may include all types of devices that can transmit and receive text messages. For example, the digital device may include mobile phones, tablet personal computers (PCs), Personal Digital Assistants (PDAs), smart TVs, and so on.

Figure 1:
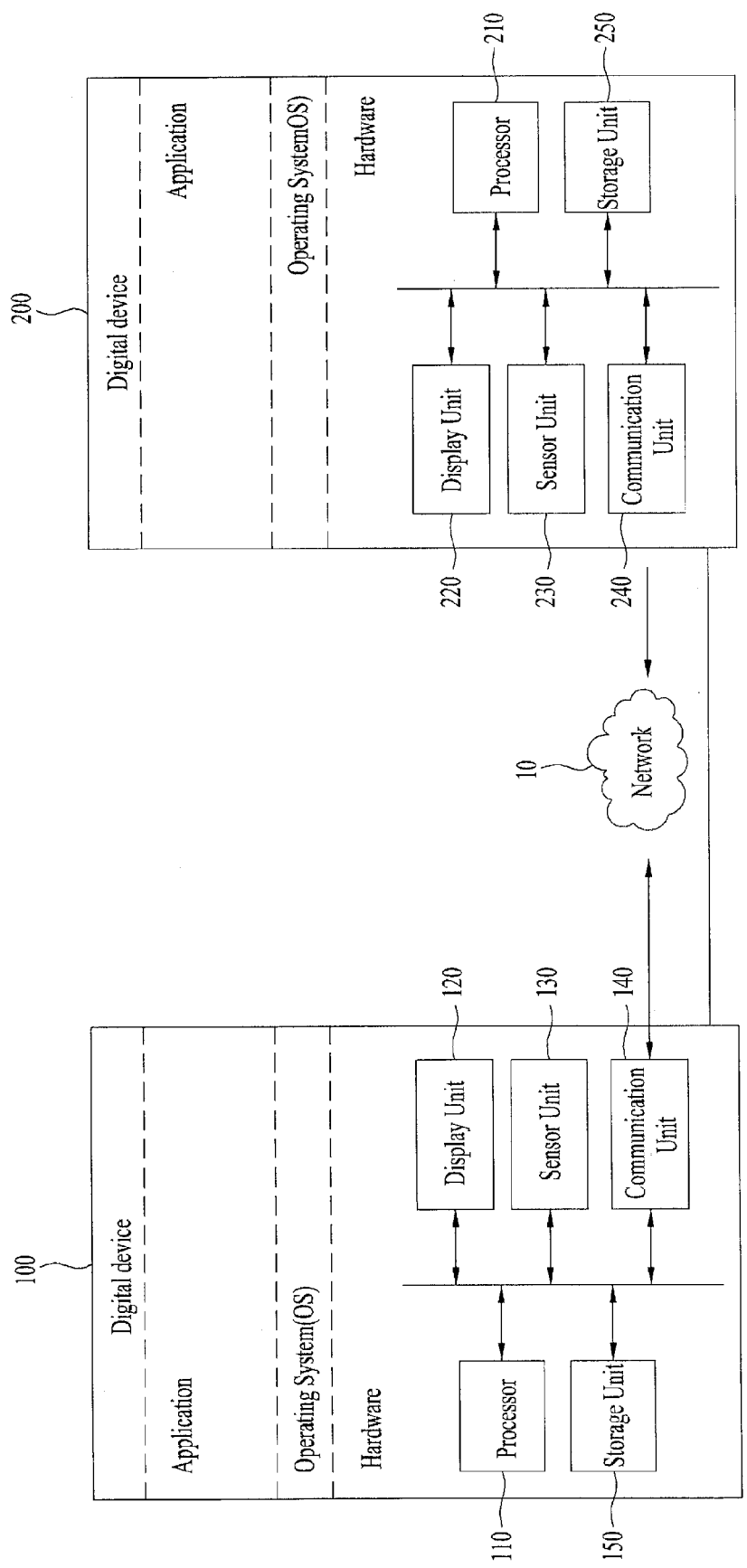
FIG. 1 illustrates a block view showing the structure of a system providing a text messaging system according to the present disclosure.

FIG. 1 illustrates a block view showing the structure of a system providing a text messaging system according to the present disclosure.

As shown in FIG. 1, a system providing a text messaging service may include a transmitting digital device 100 (hereinafter referred to as a 'transmitting device') and a receiving digital device 200 (hereinafter referred to as a 'receiving device').

Additionally, the transmitting device 100 and the receiving device 200 may transmit and receive (or transceive) a text message through a network 10. Herein, the network 10 may include diverse types (or forms) of wired or wireless networks enabling communication to be established between the transmitting device 100 and the receiving device 200.

At this point, the available wireless networks may include Near Field Communication (NFC), Zigbee, infrared communication, Bluetooth, Wi-Fi, and so on, and the available wireless network will not be limited only to a specific form of network. Moreover, all other telecommunication networks, such as a general telephone network (PSTN), a wireless telephony internet network, and so on.

The transmitting device 100 may include a hardware layer, an operating system (OS) layer, and an application layer.

First of all, the hardware layer of the transmitting device 100 may include a processor 110, a display unit 120, a sensor unit 130, a communication unit 140, and a storage unit 150.

The display unit 120 outputs image data to a display screen. The display unit 120 may output an image based upon a set of contents being executed by the processor 110 or based upon a control command of the processor 110. According to an embodiment of the present disclosure, the display unit 120 may display a text messaging interface, which is executed by the transmitting device 100.

Figure 2:
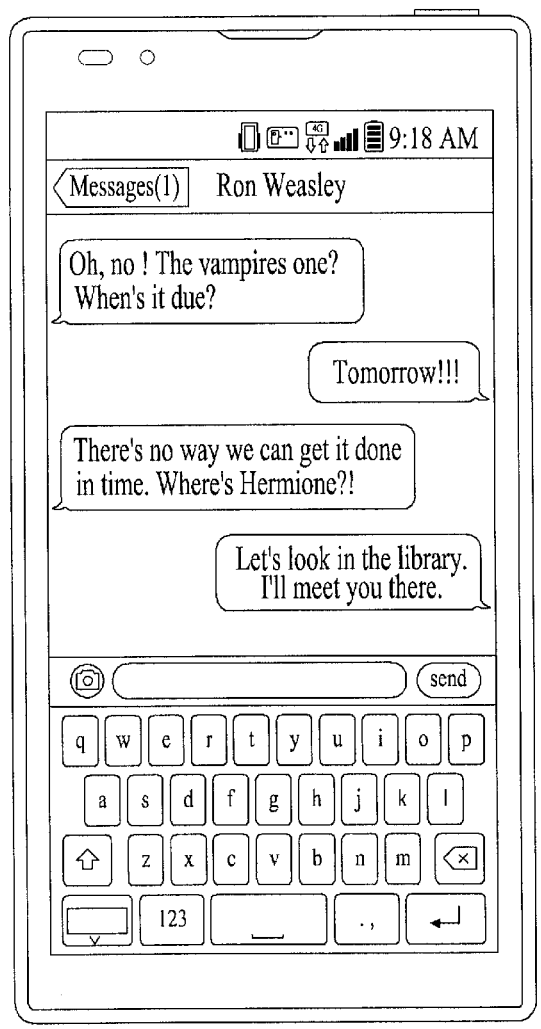
FIG. 2 illustrates an exemplary text messaging interface according to the embodiment of the present disclosure.

FIG. 2 illustrates an exemplary text messaging interface according to the embodiment of the present disclosure. A text messaging interface may provide a user using a digital device with an environment allowing the user to use a text messaging service with an external device, i.e., another digital device. The text messaging service may include both free services and paid services. Additionally, the text messaging service includes both services using a mobile communication network and services using an internet network. More specifically, the form of the text messaging service will not be limited. And, therefore, the text messaging service may include all forms of services that can provide the user with an environment for transmitting and receiving text messages.

As shown in FIG. 2, the text messaging interface may provide a transmission and reception history list of the text messages being transmitted and received between the user and another user. More specifically, the text messaging interface may display a transmission and reception history of text messages between the digital device and an external device (e.g., contents and time of the text messages that are transmitted and received).

Additionally, the text messaging interface may display an input means, i.e., a keypad and an input window configured to display a text that is inputted by using the keypad, which enables the user to write (or compose) a text message.

Accordingly, in order to allow the user to transmit and receive text messages, the text messaging interface may include a means configured to enable the user to compose (or write) a message and a means configured to display a received message, so that the user can transmit and receive messages. However, the means included in the present disclosure will not be limited only to the specific examples shown in FIG. 2. And, therefore, the corresponding means may be provided in diverse forms.

The sensor unit 130 may detect the surrounding environment of the transmitting device 100 by using at least one or more sensors mounted on the transmitting device 100. And, then, the sensor unit 130 may deliver the detected information to the processor 110 in the form of signals, Additionally, the sensor unit 130 may sense the user's input and may deliver the input signal according to the sensed result to the processor 110.

The user input may be inputted in diverse forms, such as a touch motion performed on the display (or display screen), a hovering motion over the display (or display screen), and so on. Moreover, the user input may also be inputted by using a button provided on the transmitting device 100, or by using an external device, such as a remote controller, which can transmit signals to the transmitting device 100. In other words, as long as the transmitting device 100 is capable of sensing the user's input, the form of the user input will not be limited to only a specific form of user input.

Accordingly, the sensing unit 130 may include at least one sensing means. According to the embodiment of the present disclosure, the at least one sensing means may correspond to any one of diverse sensing means, such as a gravity sensor, a geomagnetic (or terrestrial magnetism) sensor, a motion sensor, a gyroscope sensor, an acceleration sensor, an infrared sensor, an inclination sensor, a brightness sensor, an altitude sensor, an odor sensor, a temperature sensor (or thermal sensor), a depth sensor, a pressure sensor, a banding sensor, an audio sensor, a video sensor, a Global Positioning System (GPS) sensor, a touch sensor, and so on.

The sensing unit 130 collectively refers to all of the above-mentioned sensing means. Herein, the sensing unit 130 may sense diverse inputs inputted by the user and the environment of the transmitting device 100, and the sensing unit 130 may also deliver the sensed results to the processor 110, so that the processor 110 can perform the respective operations. The above-mentioned sensing means may be included in the transmitting device 100 as separate individual elements, or at least one or more of the above-mentioned sensing means may be combined and included in the transmitting device 100 as at least one or more elements.

Additionally, in case the above-described display unit 120 includes a touch sensitive display, a user input, such as a touch input, may be sensed by using the display unit 120.

Accordingly, the processor 110 may generate a control signal by using an input signal according to the user's input, which is inputted through the sensor unit 130 or the display unit 120, and, then, the processor 110 may use the generated control signal so as to control the transmitting device 100.

In other words, the processor 110 may receive the user input as an input signal through the sensor unit 130 or the display unit 120. And, then, processor 110 may use the received input signal so as to generate the control signal. Moreover, the processor 110 may control the transmitting device 100 and a configuration unit (or element) included in the transmitting device 100 in accordance with the generated control signal.

Hereinafter, when each process step or operation of the digital device is initiated or performed in accordance with the user's input, it will be apparent that a process of repeating the procedure of generating an input signal and a control signal in accordance with the user input is included in the corresponding process step. And, therefore, detailed description of the same will omitted, instead of being repeatedly provided, for simplicity.

Additionally, it may be expressed and described that the processor controls the digital device or an element included in the digital device in accordance with the user's input. And, the processor and the digital device may be considered and described to be identical to one another or may be considered and described as identical parts included in the present disclosure.

The communication unit 140 may perform communication with the receiving device 200 by using diverse protocols, so as to transmit and receive messages. At this point, a plurality of the receiving devices 200 may be included in the system, and each of the receiving devices 200 may vary in accordance with the corresponding text message.

The storage unit 150 may store diverse digital data, such as video data, audio data, images, documents, applications, and so on. The storage unit 150 represents diverse forms of digital data storage spaces, such as a flash memory, a Random Access Memory (RAM), a Solid State Drive (SSD), and so on. According to an embodiment of the present disclosure, the storage unit 150 may store text messages composed by the transmitting device 100 and text messages stored in at least one receiving device 200 along with metadata. The metadata will be described later on in more detail.

Finally, the processor 110 may execute diverse applications stored in the storage unit 150, and the processor 110 may process the data existing within the transmitting device 100. According to the embodiment of the present disclosure, the processor 110 may operate the text messaging interface, and the processor 110 may also control each unit included in the above-described transmitting device 100, so as to control the data transmission and reception between the corresponding units.

The processor 110 may control the overall operations of the transmission 100. Accordingly, as described above, it will hereinafter be described in more detail that the operations performed by the processor are performed by the digital device.

Meanwhile, an operating system (OS) layer of the transmitting device 100 may include an operating system (OS) controlling each unit included in the transmitting device 100. Herein, the operating system (OS) allows an application of the transmitting device 100 to control and use each unit included in a hardware layer. The system management efficiently distributes a resource of the transmitting device 100, so as to prepare an environment for executing each application.

Additionally, an application layer of the transmitting device 100 may include at least one application. An application includes diverse forms of programs enabling a specific operation to be performed. Moreover, an application may provide additional information on a text block included in the text message. Accordingly, with the help (or use) of the operating system (OS), the application may use the resource of the hardware layer.

Meanwhile, the receiving device 200 may include a hardware layer, an operating system (OS) layer, and an application layer. Additionally, the hardware layer of the receiving device 200 may include a processor 210, a display unit 220, a sensor unit 230, a communication unit 240, and a storage unit 250.

In case of transmitting a text message, the digital device becomes the transmitting device 100. And, in case of receiving a text message, the digital device becomes the receiving device 200. Accordingly, the elements configuring the transmitting device 100 and the respective functions are identical to the elements configuring the receiving device 200 and the respective functions. Therefore, detailed description of the units included in the layer of the receiving device 200 and the hardware layer will be omitted for simplicity.

Additionally, for simplicity in the description of the present disclosure, although the exemplary embodiment of the present disclosure describes a specific case when the digital device corresponds to the transmitting device, the same description of the present disclosure may be equally applied to the receiving device.

First of all, the digital device according to the embodiment of the present disclosure seeks to provide additional information on at least one word being designated in the form of a text block. Accordingly, the digital device may designate at least one word included in the text message, which is being displayed through the text messaging interface, in the form of a text block.

At this point, the text block may be designated by the digital device in accordance with the user input. Alternatively, the text block may also be designated by having the digital device extract a keyword regardless of the user input. Hereinafter, an exemplary embodiment of the digital device designating a text block in accordance the user input will be described in detail with reference to FIG. 3. Furthermore, an exemplary embodiment of the digital device designating a text block by extracting a keyword will be described in detail later on with reference to FIG. 6.

Figure 3:
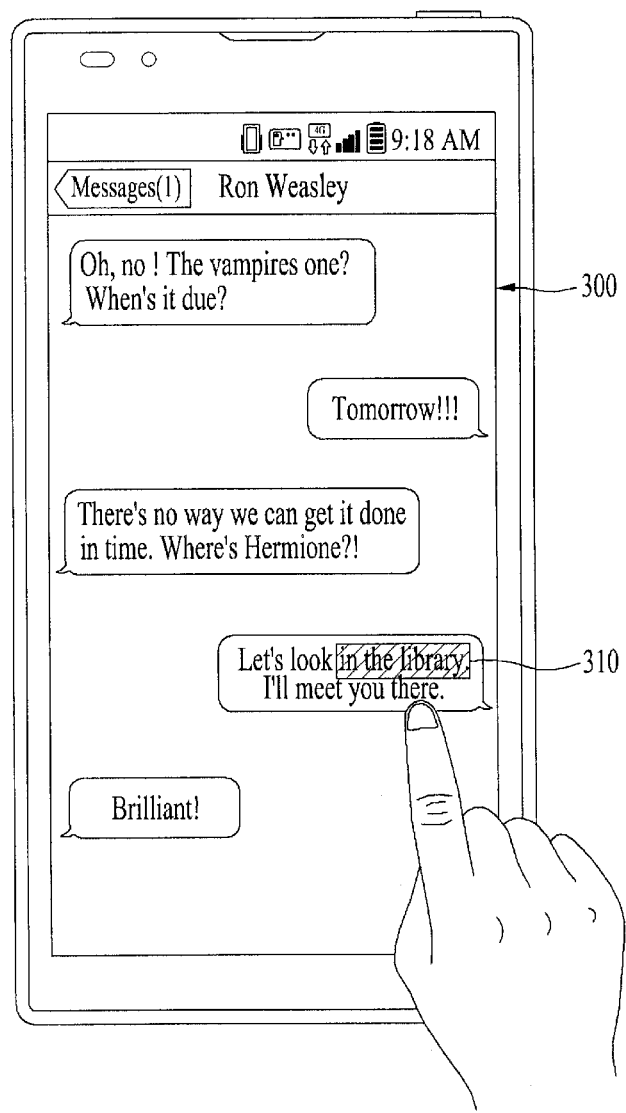
FIG. 3 illustrates an exemplary text message having a designated text block according to the embodiment of the present disclosure.

FIG. 3 illustrates an exemplary text message having a designated text block according to the embodiment of the present disclosure. As shown in FIG. 3, among the text message being displayed on the text messaging interface 300, the digital device may receive a user input related to at least one word 310, to which the user wishes to insert additional information, from the user.

When the above-described sensor unit senses the user input, and when the sensor unit delivers an input signal according to the sensed result to the processor, the processor may determine whether or not the input signal has selected the corresponding word in order to designate a text block.

For example, the processor of the digital device may determine whether or not a position from which the input signal has been sensed (or detected) corresponds to a section of the display in which the text message is being displayed. Based upon the determined result, when the sensed position corresponds to the section of the display in which the text message is being displayed, the display device may designate at least one word being displayed in the position, from which the input signal has been sensed (or detected), in the form of a text block, and the display device may then apply a graphic effect on the designated text block.

The digital device may box the at least one corresponding word, so that the at least one corresponding word can be included in the text block. Alternatively, the digital device may apply diverse forms of graphic effects, such as underlines, highlights, and so on, on the at least one corresponding word, so that the at least one corresponding word can be differentiated from the other words included in the text message.

At this point, the user selects a word, which the user seeks to designate in the form of a text block, through a displayed graphic image. Substantially, however, the at least one word that is viewed by the user is merely an image. Accordingly, when the digital device detects an input signal as a signal designating a text block, the digital device may capture the graphic image displayed on the section of the display corresponding to the input signal in a text form.

More specifically, among the graphic images being displayed on the text messaging interface, the digital device may detect a section of the graphic image, which is selected according to the user's input. Then, after capturing the detected section, the digital device may recognize the at least one word, which is included in the detected section, as a text string.

Alternatively, the digital device may directly recognize the text data, which are included in the displayed graphic image, without having to perform the capturing process. For example, if a program of the text messaging interface is made by Hyper Text Markup Language (HTML), the processor of the digital device displays the graphic image including text according to text coordinates of code of the program. And, when a user input which is corresponding to the text coordinates is detected for the graphic image, the processor may directly recognize the text included in the graphic image by using the code of the program made by HTML.

Figure 4:
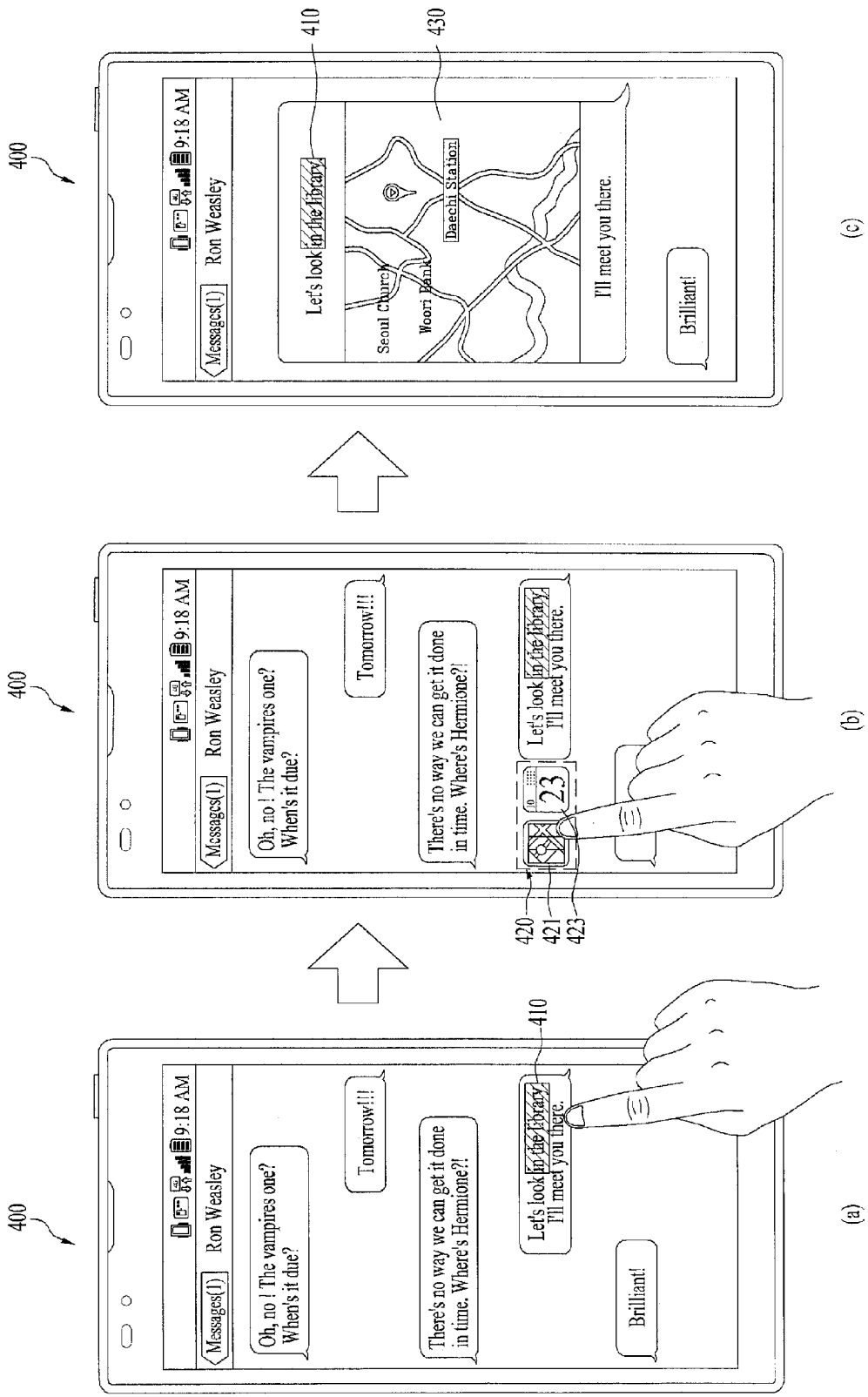
FIG. 4 illustrates an exemplary text message having additional information inserted therein according to the embodiment of the present disclosure.

FIG. 4 illustrates an exemplary text message having additional information inserted therein according to the embodiment of the present disclosure. Herein, FIG. 4 corresponds to an example of the digital device designating a text block in accordance with a user input.

As shown in (a) of FIG. 4, the digital device 400 may designate at least one word, which is included in a text message being displayed in accordance with the user input, in the form of a text block 410.

When the text block is designated, the digital device 400 may extract at least one application providing additional information on the designated text block 410. The additional information uses the at least one word included in the text block 410, so as to include information related to the result of executing a respective application. The additional information will hereinafter be described in more detail with reference to the accompanying drawings.

Additionally, the digital device 400 may use the application, which is stored in the storage unit, and the information related to the corresponding application, so as to extract an application that can be executed by using at least one word included in the text block. More specifically, the display device 400 may extract an application, which can use the at least one word being included in the text block as input data for executing the application.

For example, the digital device 400 may extract an application for performing map search, web search, contact search, and so on. Additionally, the digital device 400 may also retrieve contents including at least one of a still image and a moving image by using the at least one word of the text block. Then, the digital device 400 may extract an application that can display the retrieved result.

Furthermore, the display device 400 may pre-set at least one application in advance. Then, among at least one of the pre-set applications, the display device 400 may extract an application, which can obtain additional information by using the at least one word being included in the text block.

When the digital device 400 extracts an application, which can provide additional information on the at least one word being included in the text block 410, as shown in (b) of FIG. 4, the digital device 400 may display an application interface 420.

The application interface 420 corresponds to an interface including at least one icon 421 and 423 representing the extracted application. Herein, the application interface 420 may receive a user input that selects a specific icon from the at least one icon being included in the application interface 420. The at least one icon 421 and 431 being included in the application interface 420 may each correspond to a graphic image including at least one of characters, signs, and images.

Additionally, when the digital device 400 detects an input signal for a specific icon 421 included in the application interface 410, the input signal being generated by the user, the digital device 400 may execute an application corresponding to the specific icon 421, from which the input signal is detected. Moreover, as shown in (c) of FIG. 4, depending upon the execution of the application, the digital device 400 may insert additional information, which is provided by the application, to the text message.

However, as shown in FIG. 4, when the user select the specific icon 421, which is included in the application interface 420, although the digital device 400 may execute the application corresponding to the selected specific icon 421, the display screen is not switched (or changed) to an execution screen of the respective application.

More specifically, the digital device 400 executes the corresponding application via multi-tasking along with the text messaging interface. And, accordingly, the corresponding application is internally executed. Therefore, the user is incapable of recognizing the execution of the application, and the user is only capable of recognizing that the additional information that is inserted with respect to the text block is being provided by the corresponding application.

Meanwhile, the icons being included in the application interface 420 according to the embodiment of the present disclosure each corresponds to an icon configured to indicate the type of application providing the additional information. Accordingly, each of the icons being included in the application interface 420 has an additional function.

For example, the icons being included in the application interface 420 may each represent an application, a document, a specific function, and so on. Additionally, when the user selects the corresponding icon, the selected icon may be hyperlinked with an application, a document, a content, and so on, so that the digital device can directly and immediately execute the application, the document, the content, and so on, which is represented by the selected icon. However, the digital device may not change its display screen to the execution screen of the corresponding application. More specifically, the icon being included in the application interface 420 may have a function of enabling the digital device to simultaneously execute the application corresponding to the selected icon along with the text messaging interface via multi-tasking, yet executing the corresponding application internally only.

In other words, when the user selects a specific icon being included in the application interface, the digital device does not change the display screen to an execution screen of an application corresponding to the specific icon, and the digital device may insert only the additional information associated with the text block according to the execution of the application.

Meanwhile, the digital device may display the application interface in diverse forms. This will hereinafter be described in more detail with reference to FIG. 5 and FIG. 6.

Figure 5:
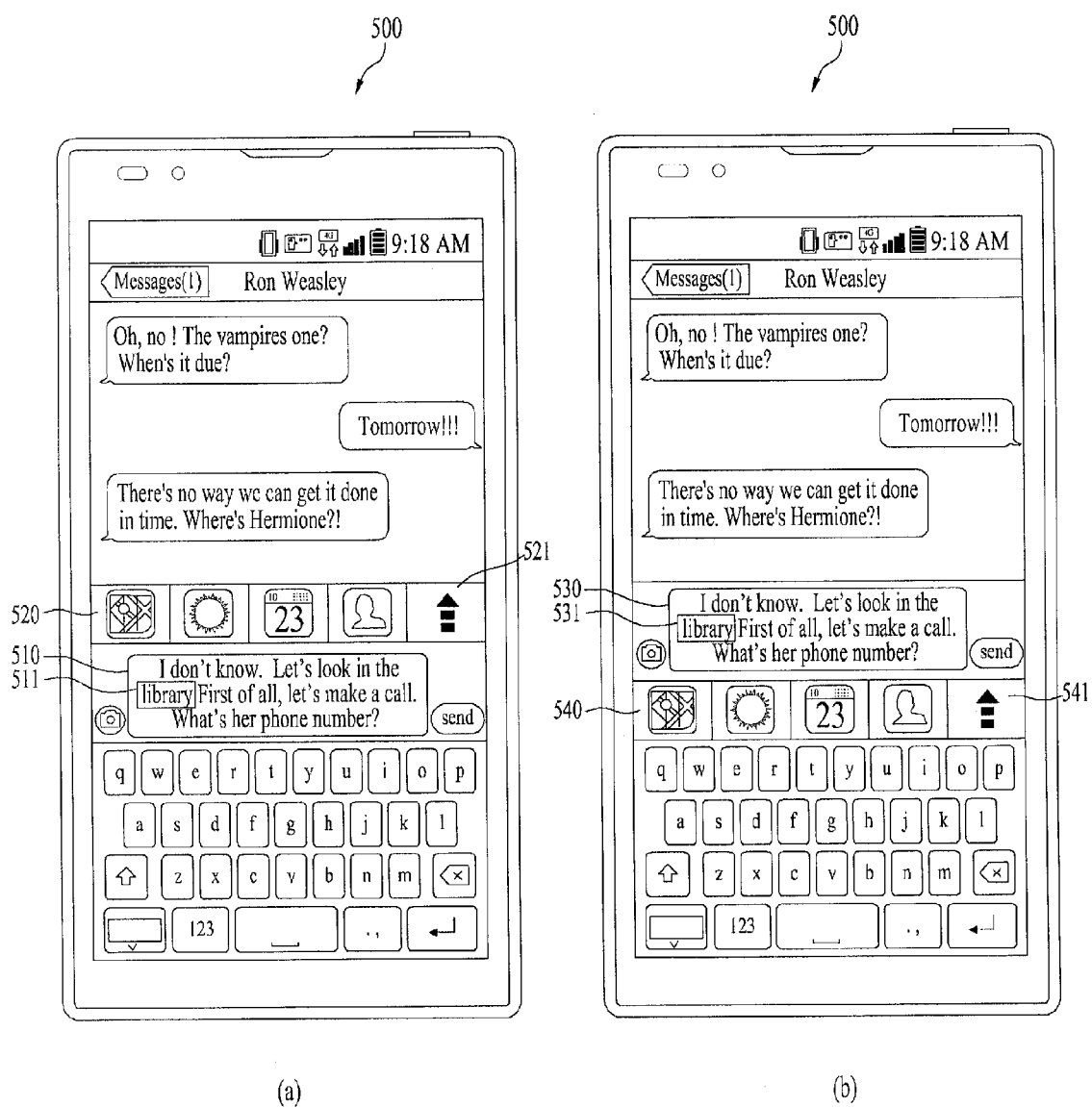
FIG. 5 illustrates an exemplary application interface being displayed in a text messaging interface according to the embodiment of the present disclosure.

FIG. 5 illustrates an exemplary application interface being displayed in a text messaging interface according to the embodiment of the present disclosure. Herein, the digital device 500 may display the application interface 520 and 540 in the surrounding area of the text message.

More specifically, as shown in (a) of FIG. 5, when a text block 511 is included in a text message, which is currently being written (or composed), the digital device 500 may display the application interface 520 on an upper portion of the message input window 510.

At this point, when an excessive number of icons are included in the application interface 520, the digital device 500 may provide a Turn Page menu 521, which is included in the application interface 520. The user may view the remaining icons by using the Turn Page menu 521 so as to turn the pages that are displayed on the application interface 520, wherein the pages show all of the icons that are included in the application interface 520.

Additionally, as shown in (b) of FIG. 5, when a text block 531 is included in a text message, which is currently being written (or composed), digital device 500 may display the application interface 540 on a lower portion of the message input window 530. Also, as shown in (a) of FIG. 5, digital device 500 may provide a Turn Page menu 541, which is included in the application interface 540.

As described above, by displaying the application interface on the surrounding area of a message including a text block, the digital device may allow the user to more quickly and more conveniently selecting an icon for acquiring additional information.

Additionally, although the example shown in FIG. 5 describes a case when a text block is included in a message that is currently being written (or composed), a text block may be designated with respect to an already-transmitted message and an already-received, so that at least one word can be included in the designated text block. And, the respective additional information may also be inserted in the corresponding text message.

However, since a portion of the text messaging interface may be covered by the application interface, the digital device 500 may move (or relocate) the application interface 520 and 540 in accordance with the user input.

Figure 6:
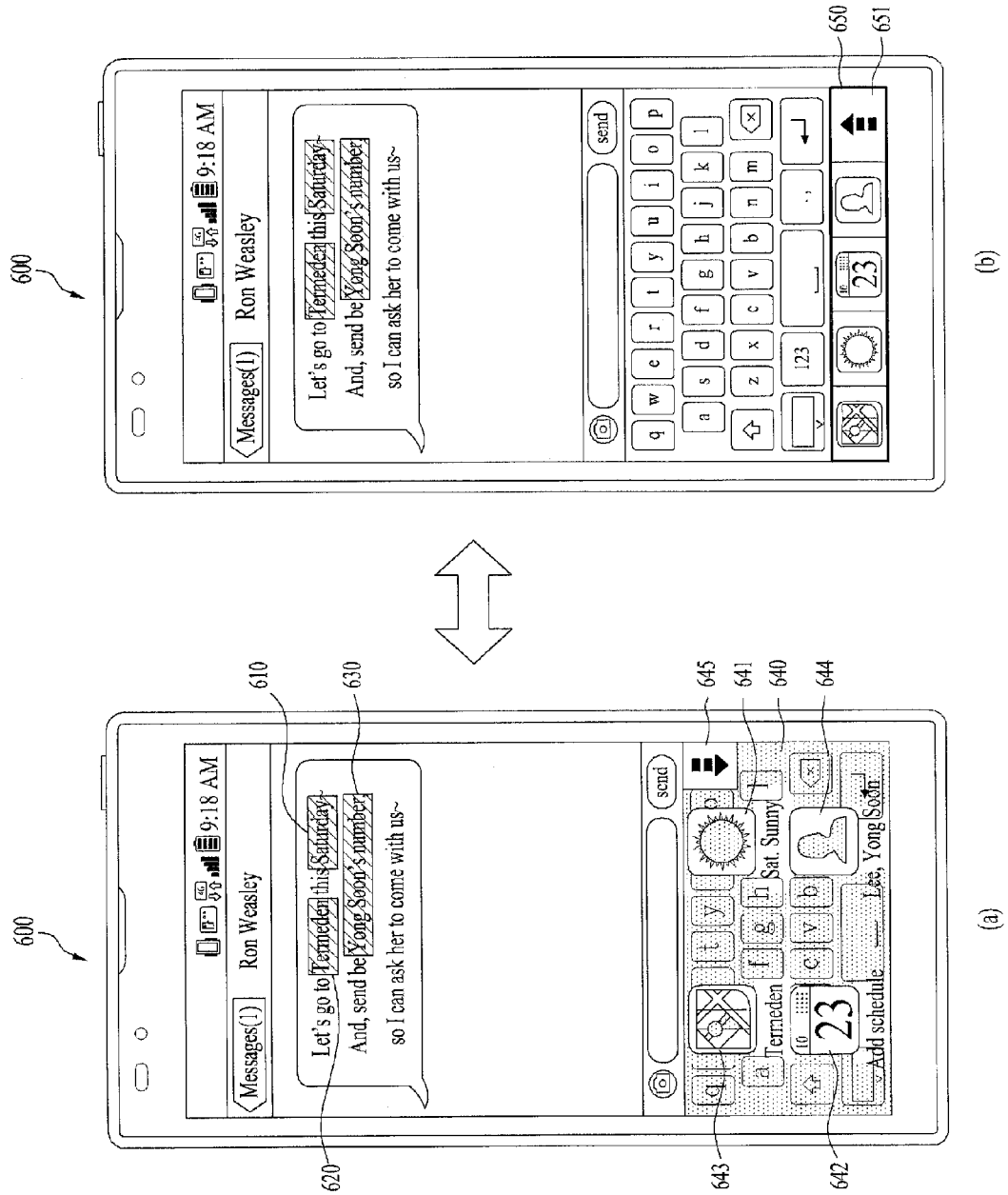
FIG. 6 illustrates another exemplary application interface being displayed in a text messaging interface according to the embodiment of the present disclosure.

FIG. 6 illustrates another exemplary application interface being displayed in a text messaging interface according to the embodiment of the present disclosure. Herein, the digital device 600 according to the embodiment of the present disclosure may display the text messaging interface overlaid with the application interface 640 in a layer format.

Prior to describing the application interface 640, an example of having the digital device 600 designate a text block will hereinafter be described in detail.

In addition to the method described with reference to FIG. 3, the digital device 600 may extract at least one keyword from a text message, even if there is no user input. For example, the digital device 600 may extract a keyword based upon a noun or a pronoun. However, in the digital device 600 according to the embodiment of the present disclosure, the method for extracting the keyword will not be limited only to a specific method, and, therefore, a wider range of methods for extracting the keyword may be used.

Additionally, the digital device 600 may designate at least one of the extracted keywords in the form of text blocks 610, 620, and 630. And, the digital device 600 may add graphic effects on the designated text blocks 610, 620, and 630. The graphic effect has already been described in detail with reference to FIG. 3. And, therefore, the detailed description of the same will be omitted for simplicity.

Furthermore, the digital device 600 may extract at least one application that provides additional information on a text block, and the digital device 600 may then display the application interface 640 including at least one icon representing the extracted application.

Referring to (a) of FIG. 6, when a plurality of text blocks 610, 620, and 630 exists, the digital device 600 may extract an application that can provide additional information on each of the text blocks 610, 620, and 630.

For example, since a first text block 610 includes a word related with the date, the digital device 600 may extract a Weather application providing additional information on the weather on the corresponding date and may also extract a Calendar application adding a new schedule on the corresponding date.

Additionally, since a second text block 620 corresponds to a word related to a specific place, the digital device 600 may extract a Map application providing additional information on the travel path for getting to the corresponding place. Furthermore, since a third text block 630 corresponds to a word related to a user's name and contact number, the digital device 600 may extract a Contact application providing additional information on a contact number (i.e., phone number) corresponding to a user's name.

As described above, in order to extract an application that is related to a specific word, the digital device 600 may pre-store an application related to the corresponding word in advance in the storage unit. More specifically, the digital device 600 may categorize each of the words and may pre-set an application that matches with each of the corresponding words.

Then, the digital device 600 may display the application interface 640, which includes at least one icon representing the extracted application. Accordingly, the digital device 600 may display an icon 641 corresponding to the Weather application, an icon 642 corresponding to the Calendar application, an icon 643 corresponding to the Map application, and an icon 644 corresponding to a Contact application on the application interface 640.

Additionally, the digital device 600 may provide a recapitulated version of additional information below each application icon. As described above, by simultaneously providing the recapitulated version of additional information below each application icon to the application interface, the user may be capable of easily verifying whether or not the additional information that is to be inserted in correct.

Moreover, the application interface 640 shown in (a) of FIG. 6 corresponds to a semi-transparent layer overlaying the text messaging interface. Most particularly, by having the application interface 640 overlaying the remaining area of the text messaging interface excluding the text messaging area, e.g., a keypad area, the user may continue to view the contents of the text message without being interrupted.

Nevertheless, in some cases, the application interface 640 may interrupt the user's eyesight. Accordingly, the application interface 640 may provide a Reduce menu 645. Therefore, when a user input is detected with respect to the Reduce menu 645, the digital device 600 may hide the application interface 640.

The hidden application interface 650 may be displayed as shown in (b) of FIG. 6. The hidden application interface 650 may simply indicate only the icons being included in the application interface 650 and may provide an Enlarge menu 651. Accordingly, when the digital device 600 detects an input signal of the user with respect to the Enlarge menu 651, the digital device 600 may display the hidden application interface 650 as the application interface 640 shown in (a) of FIG. 6.

Herein, however, the number of displayable application interfaces 640 and 650 may be limited. Accordingly, the digital device may extract a predetermined number of applications corresponding to a predetermined priority level. The predetermined number of application interfaces may correspond to a number of icons that can be displayed on the application interface.

The priority level may be decided by using at least one of transmission information and reception information related to the text message, history information of the transmitted and received text messages, Social Network Service (SNS) usage information associated with the transmission information and reception information. Additionally, the priority level may also be decided based upon user settings. Therefore, the digital device may provide the user with an interface for setting up the priority level.

For example, a plurality of applications may provide additional information on a specific word. At this point, the digital device may determine which application has provided the most amount additional information with respect to the same word, based upon the text message history, thereby being capable of extracting the corresponding application based upon the predetermined priority level.

Figure 7:
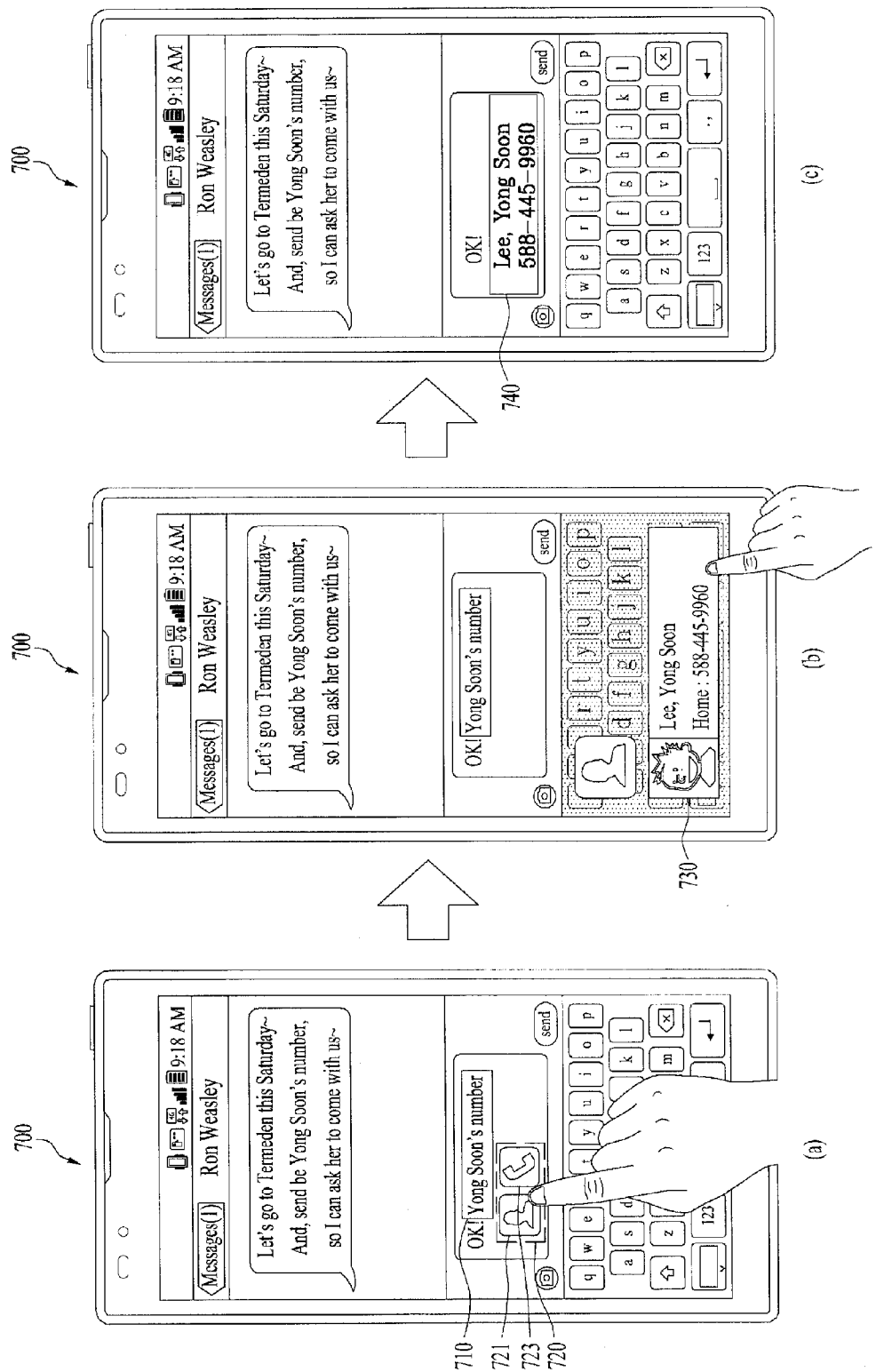
FIG. 7 illustrates an example of displaying preview information on additional information associated with a text block according to the embodiment of the present disclosure.

Meanwhile, FIG. 7 illustrates an example of displaying preview information on additional information associated with a text block according to the embodiment of the present disclosure.

As described above, the digital device 700 may extract an application that provides additional information with respect to a text block 710. Additionally, as shown in (a) of FIG. 7, the digital device 700 may display an application interface 720 including at least one icon representing the extracted application.

The digital device 700 may detect an input signal to a specific icon, which is included in the application interface 720. When the user selects an icon 721 representing an application, from which he (or she) wishes to acquire additional information, from the application interface 720, the sensor unit senses such selection and may deliver the sensed user selection to the processor in the form of an input signal. If the processor receives the input signal, the processor detects the received input signal as an input signal to the icon 721, extracts additional information by executing the application corresponding to the icon 721.

At this point, the user may verify whether or not the extracted additional information corresponds to the additional information he (or she) wished for. Then, only when the extracted additional information matches the wanted information, the user may wish to insert the extracted additional information to the text message. Accordingly, when the digital device 700 according to the embodiment of the present disclosure detects an input signal respective to the specific icon 721, the digital device 700 may display preview information 730 of the additional information, which is provided to the user by the application corresponding to the icon 721 having its respective input signal detected by the digital device 700, as shown in (b) of FIG. 7.

Therefore, the user may refer to the preview information 730, so as to verify whether or not the additional information corresponding to the preview information 730 is the correct additional information he (or she) had intended. If the corresponding additional information is not what was intended by the user, the user may select another icon 723 from (a) of FIG. 7. Alternatively, if the corresponding additional information is in fact what was intended by the user, the user may select the corresponding preview information 730. When the digital device 700 detects an input signal respective to the preview information 730, the digital device 700 may insert the additional information corresponding to the preview information 730 to the text message.

At this point, as shown in (c) of FIG. 7, the digital device 700 may replace the text block 710 with the inserted additional information 740. More specifically, the digital device 700 may insert the additional information 740 in a position designated by the text block 710 within the text message, and then the digital device 700 may delete the text block 710.

As described above, the digital device enables the user to insert additional information on a message that is currently being written (or composed) or on a message that has already been transmitted and/or received. More specifically, by providing the user with a text messaging interface allowing the user to edit the text message and add additional memos to the text message, the digital device may enhance user convenience.

Meanwhile, the digital device according to the embodiment of the present disclosure may designate a text block in a text message that is currently being written, and the digital device may insert additional information on the text block. However, when transmitting the corresponding text message to an external device, instead of transmitting the entire text message having the additional information inserted therein, it may be more efficient to transmit only the text message prior to having the additional information inserted therein and link information on the additional information. Accordingly, since the size of the transmitted text message can be reduced, the efficiency in using resource or time may be more enhanced.

Therefore, when transmitting a text message, the digital device may transmit a message file format, which includes the text message and metadata on the text message, to an external device.

Herein, metadata may include at least one of at least one word being included in the text block, application information providing additional information on the text block, additional information being provided by the corresponding application, and link information on the additional information. Herein, for example, the link information on the additional information may correspond to at least one of information on the type of application providing the additional information, execution information of the application, and Uniform Resource Locator (URL) information from which the application can be downloaded.

Therefore, when required by the user of the receiving device, the digital device may allow the additional information to be displayed or may allow the additional information to be inserted in the text message through the application, which is executed by the receiving device. Accordingly, as compared to the case when the digital device inserts the additional information itself to the text message and transmits the processed text message, it will be advantageous in that, instead of pre-decided additional information, the most recent (or updated) additional information may be provided to the user of the receiving device at the moment he (or she) wishes to view the additional information.

Therefore, in order to transmit the text message the digital device may connect the text block with the link information on the additional information, so as to set up a hyperlink on the text block. Accordingly, when the user of the receiving device selects the text block, the application that is connected to the text block via hyperlink may be executed. At this point, the application may be executed by using the execution state of using the at least one word, which is included in the text block, as the initial display screen.

Additionally, when an application being connected via hyperlink is not installed in the receiving device, the receiving device may execute a web page for installing the corresponding application or may execute an application for installing the corresponding application.

Furthermore, when the digital device transmits a text message including a text block for providing additional information to the external device, the digital device may set up the format of the additional information that is to be inserted. This will hereinafter be described in more detail with reference to FIG. 8.

Figure 8:
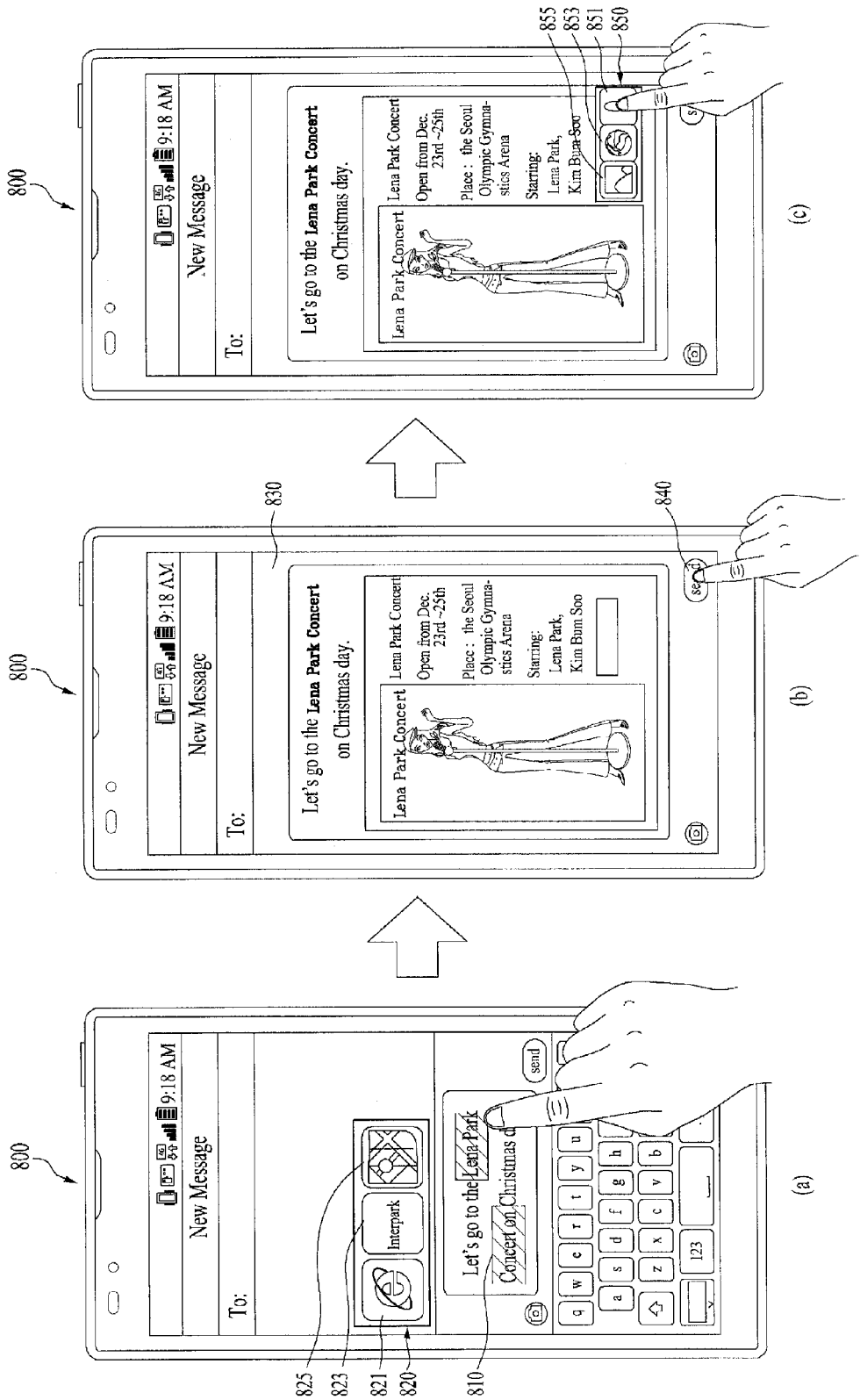
FIG. 8 illustrates an exemplary additional information interface setting up a format of the additional information according to the embodiment of the present disclosure.

FIG. 8 illustrates an exemplary additional information interface setting up a format of the additional information according to the embodiment of the present disclosure.

As shown in (a) of FIG. 8, when the digital device 800 detects an input signal to the text block 810, the digital device 800 may display an application interface 820. The application interface 820 may include icons 821, 823, and 825 each corresponding to the application that can provide additional information on the text block 810.

At this point, it will be assumed that the user selects an icon 821 corresponding to an internet browser, in order to provide the web searched result as the additional information. Accordingly, as shown in (b) of FIG. 8, the digital device may insert the searched result to the text block 810 in the text message as the additional information. The additional information shown in (b) of FIG. 8 includes information on a poster of a concert, the opening schedule of the concert, the place of the concert, the stars starring in the concert, and so on, as the searched result associated with the text block 810 searched through the corresponding internet browser.

Herein, however, among the searched result, the user may wish to transmit only the concert poster as the additional information, or the user may wish to transmit only the information on the place where the concert is opening as the additional information, or the user may wish to transmit only the overall guidance information on the concert as the additional information.

Therefore, as shown in (b) of FIG. 8, when the digital device according to the present disclosure detects an input signal to a Send menu 840 transmitting the text message to the external device, the digital device may display an additional information interface 850, as shown in (c) of FIG. 8.

The additional information interface 850 may provide an environment allowing the user to select the format in which the additional information is to be inserted in the text message and transmitted. Additionally, among the result of executing the application by using the at least one word, which is included in the text block, the additional information interface 850 may provide the user with an environment enabling the execution result of the executed application, so that the user can insert only the wanted information as the additional information.

Accordingly, among the result of executing the application by using the at least one word, which is included in the text block 810, the additional information interface 850 may include a menu 855 for extracting only an image and inserting the extracted image in the text message, a menu 853 for inserting link information of the application in the text message, and a menu 851 for inserting an overall screen of executing the application in the text message in an image file format. This will hereinafter be described in detail with reference to FIG. 9 and FIG. 10.

As described above, among the information according to the executed result of the application through the additional information interface 850, the digital device 800 may provide the user with an environment for extracting only a specific information and inserting the extracted information as the additional information and an environment enabling the user to select a format in which the additional information is transmitted.

Additionally, FIG. 8 illustrates an example of providing an additional information interface, when the digital device seeks to send (or transmit) a text message. Conversely, the digital device may provide an additional information interface after inserting the additional information or before inserting the additional information. Herein, however, the time point at which the additional information interface is provided will not be limited only to a specific time point.

Figure 9:
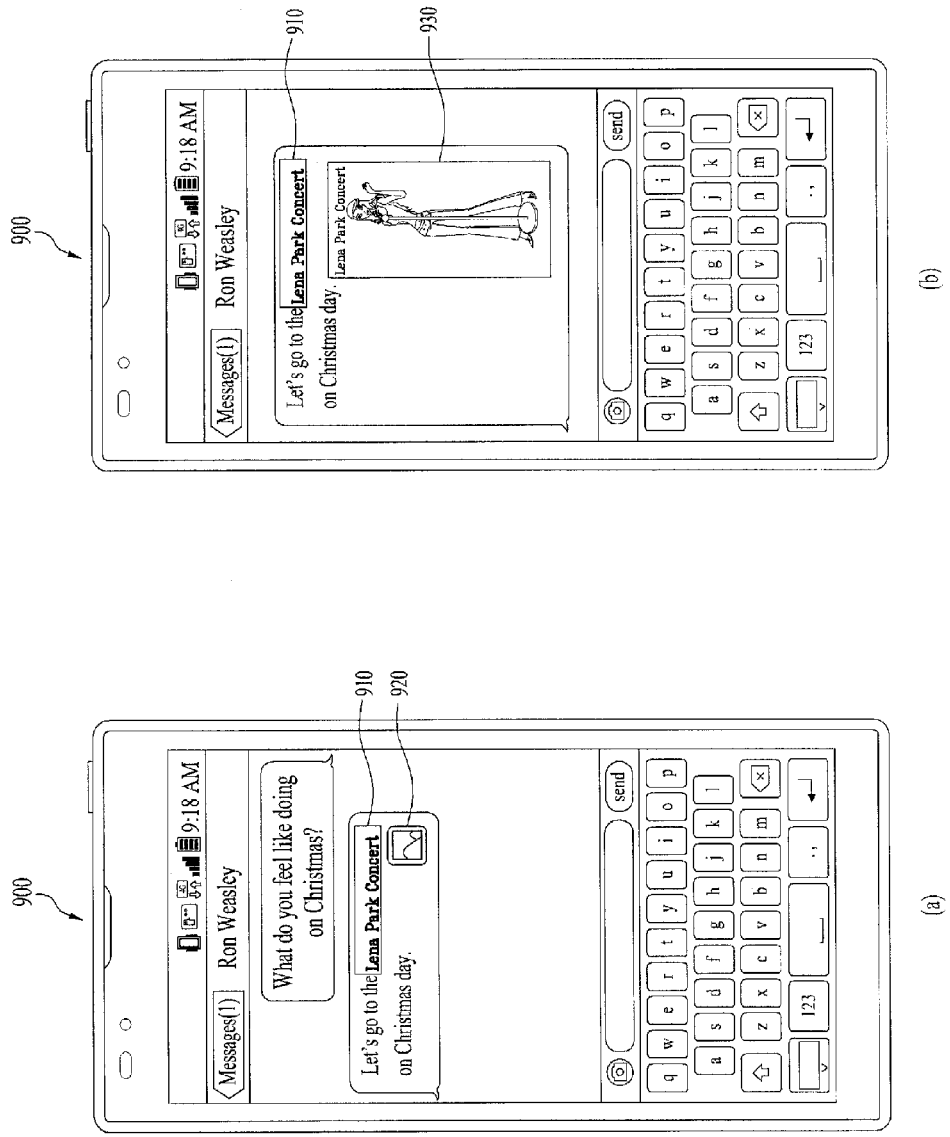
FIG. 9 illustrates an example of displaying additional information based upon the additional information format, which is set up is FIG. 8, according to the embodiment of the present disclosure.

FIG. 9 illustrates an example of displaying additional information based upon the additional information format, which is set up is FIG. 8, according to the embodiment of the present disclosure.

(a) of FIG. 9 shows an example of a case when, among the executed result of the corresponding application, the user has selected the menu 855 for extracting only an image and inserting the extracted image in the text message by using the additional information interface 850 of FIG. 8

Accordingly, the digital device 900 may display the fact that a text block 910 and additional information on the text block 910 exist as images, in the form of an icon 920.

Additionally, the digital device 900 may insert the additional information 930 itself to the text block 910 in the form of an image, and then the digital device 900 may display the image as shown in (b) of FIG. 9.

As described above, the digital device 900 may directly inserted additional information 930 to the text message, as shown in (b) of FIG. 9. Alternatively, the digital device 900 may insert only a minimum amount of information indicating the fact that the additional information exists and notifying the format of the additional information to the text message, as shown in (a) of FIG. 9. As shown in (a) of FIG. 9, when the digital device 900 senses a user input to the icon 920 indicating the format of the additional information, the additional information 930 may be displayed as shown in (b) of FIG. 9.

Figure 10:
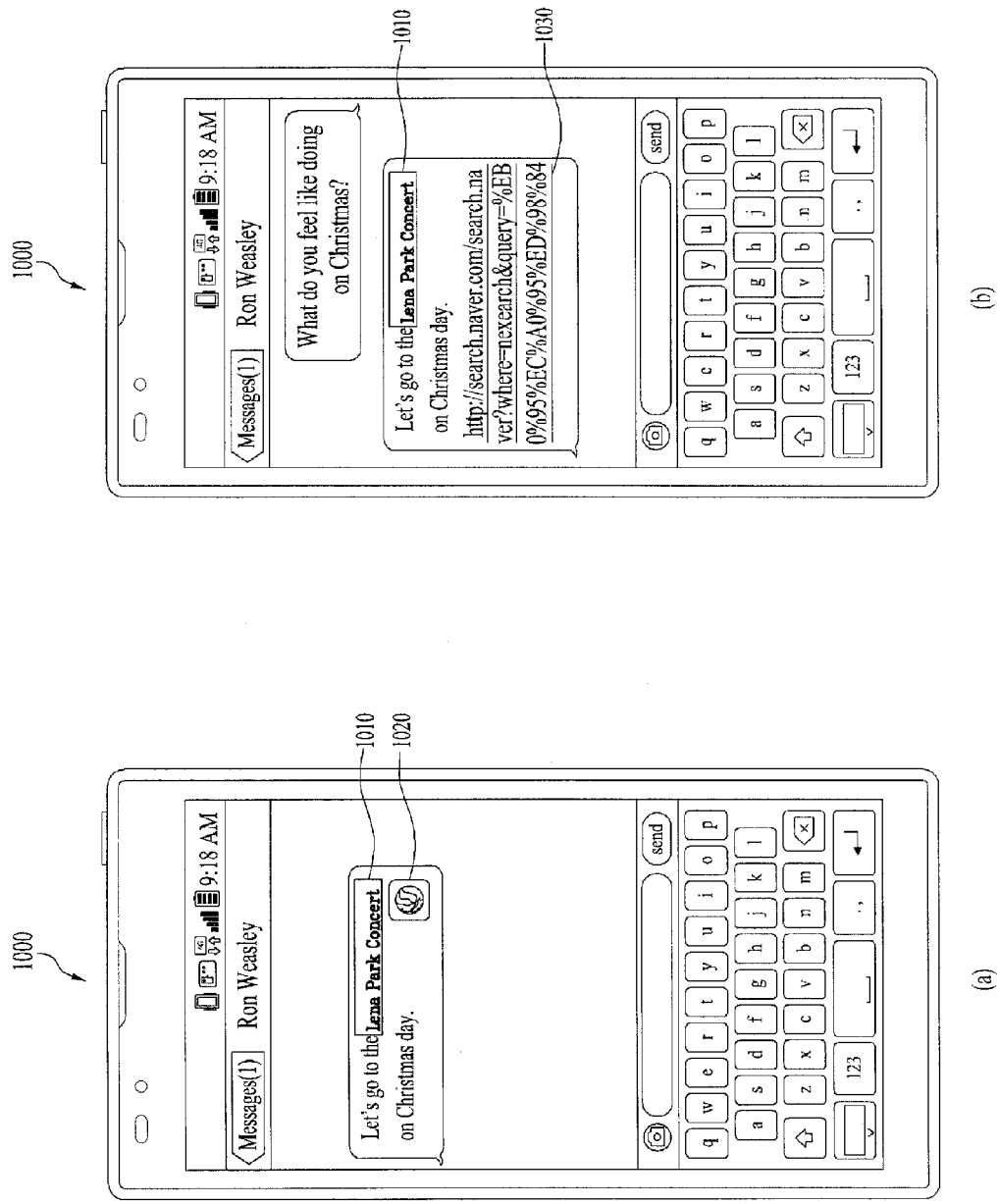
FIG. 10 illustrates another example of displaying additional information based upon the additional information format, which is set up is FIG. 8, according to the embodiment of the present disclosure.

FIG. 10 illustrates another example of displaying additional information based upon the additional information format, which is set up is FIG. 8, according to the embodiment of the present disclosure.

(a) of FIG. 10 illustrates an exemplary case when the user has selected the menu 853 for inserting link information of the application in the text message through the additional information interface 850 shown in FIG. 8.

Accordingly, the digital device 1000 may display a text block 1010 and an icon 1020, which indicates that additional information on the text block 1010 exists as link information, on the text message.

Additionally, as shown in (b) of FIG. 10, the display device 1000 may insert the additional information itself to the text message. At this point, the additional information that is being inserted may be linked with an execution result of an actual application. Therefore, when the user selects the additional information 1030, the digital device 1000 may immediately display the execution result of the corresponding application, or may allow the execution result to be inserted in the text message.

Meanwhile, metadata, which are transmitted to an external device along with the text message, may include at least one of information on the location (or location information) of the digital device and information on the authority (or authority information) to track the location of the digital device. This will hereinafter be described in detail with reference to FIG. 11.

Figure 11:
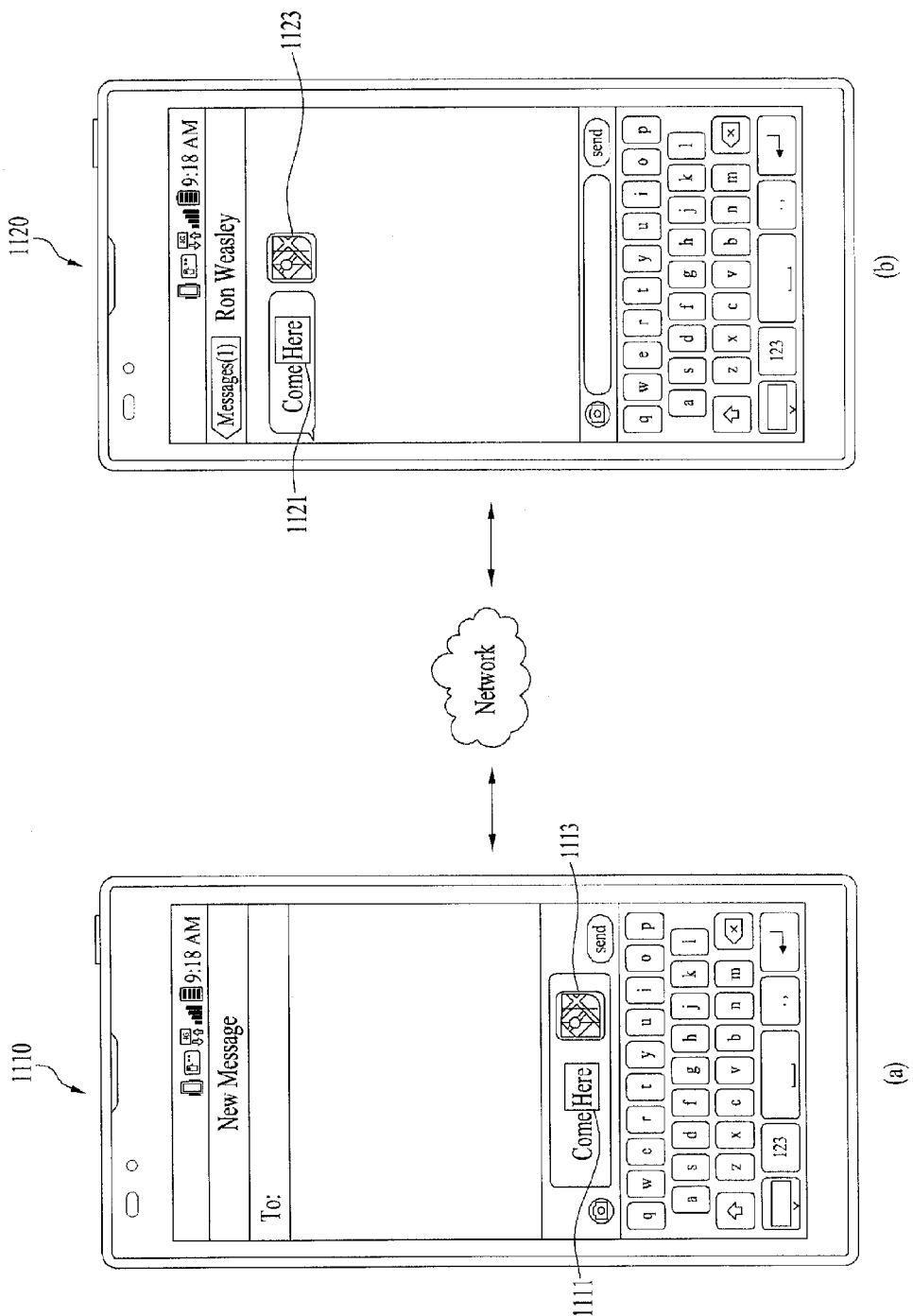
FIG. 11 illustrates an example of another set of additional information being inserted in a transmitting digital device and a receiving digital device with respect to the same link information according to the embodiment of the present disclosure.

FIG. 11 illustrates an example of another set of additional information being inserted in a transmitting digital device and a receiving digital device with respect to the same link information according to the embodiment of the present disclosure.

As shown in (a) of FIG. 11, the transmitting device 1110 may designate a text block 1111 within respect to a text message that is to be transmitted. The procedure performed by the transmitting device 1110 for inserting additional information is identical to the procedure that is described above with reference to FIG. 4. However, as described above with reference to (a) of FIG. 9 and (a) of FIG. 10, the transmitting device 1110 may display an icon indicating that additional information associated with the text block exists in the text message, e.g., an icon 1113 representing an application that provides the additional information may be displayed along with the text message. And, when the user selects the displayed icon 1113, the corresponding additional information may be displayed.

Herein, however, the text message being provided through the text messaging interface of the transmitting device 1110 is differentiated from a text message being transmitting by the transmitting device 1110 to a receiving device 1120. More specifically, the transmitting device 1110 may collectively transmit a text message prior to having the additional information inserted thereto and metadata related to the text message to a receiving device 1120 in the form of a message file.

The metadata may include at least one of at least one word being included in the text block, application information providing additional information on the text block, additional information being provided by the corresponding application, and link information on the additional information.

The receiving device 1120 may receive a message file including the text message and the metadata related to the text message from the transmitting device 1110. According to the embodiment of the present disclosure, a case when the received metadata include application information, which provides additional information associated with at least one word 1111 being included in the text message, and link information for a result of executing the application by using the at least one word will hereinafter be described in detail.

First of all, the receiving device 1120 may designate at least one word included in the text message and being related to the link information in the form of a text block 1121. As described above with reference to FIG. 3, the receiving device 1120 may apply graphic effects to the designated text block.

As shown in (b) of FIG. 11, the receiving device 1120 may display an application interface including an icon 1123, which indicates an application providing additional information.

At this point, however, the icon 1113 being displayed on the text messaging interface of the transmitting device 1110 and the icon 1123 being displayed on the text messaging interface of the receiving device 1120 may not represent the same application. This is because the type of application being installed in each of the transmitting device 1110 and the receiving device 1120 may be different from one another. For example, even if the application can perform web search, the search engine or basic provider may be differently set up depending upon the device.

Therefore, although the application types can be similar to one another, the application providing the additional information from the transmitting device 1110 may be different from the application providing the additional information from the receiving device 1120.

Hereinafter, an exemplary embodiment of the present disclosure of the metadata, which are transmitted to an external device along with the text message, may include at least one of information on the location (or location information) of the digital device and information on the authority (or authority information) to track the location of the digital device, will be described in detail with reference to FIG. 11.

As shown in (a) of FIG. 11, the transmitting device 1110 may transmit a text message, which informs the transmitting device 1110 (or the user of the transmitting device 1110) to come "Here". Then, among the plurality of words included in the text message, the transmitting device 1110 may designate the word "Here" in the form of a text block 1111. Thereafter, in order to provide the additional information associated with the text block 1111, the transmitting device 1110 extracts a Map application, which displays the location (or position) of the transmitting device 1110 on a map.

Additionally, the transmitting device 1110 may transmit (or send) the metadata, which includes information on the authority (or authority information) to track the location of the transmitting device 1110, to the receiving device 1120 along with the text message.

At this point, the Map application of the transmitting device 1110 may provide a map, which indicates the location from which the text file was transmitted to the receiving device 1120 from the transmitting device 1110, as the additional information.

Meanwhile, after receiving the text file, the receiving device 1120 may display the text message and may use the metadata to designate the text block 1121. Also, by adding a graphic effect on the designated block 1121, the receiving device 1120 may indicate that the text block 1121 includes additional information.

Furthermore, when the receiving device 1120 detects an input signal of the user to the text block, the receiving device 1120 may extract an application according to the link information by using the link information, which is included in the metadata. Thereafter, the receiving device 1120 may display an application interface including at least one icon representing the extracted application.

As shown in (b) of FIG. 11, since the link information corresponds to the information for the Map application, the receiving device 1120 may display an icon representing the Map application, which is installed in the receiving device 1120, on the application interface.

At this point, when the receiving device 1120 detects an input signal inputted by the user with respect to the corresponding icon 1123, the receiving device 1120 may insert the additional information, which is provided by the application corresponding to the icon 1123, in the text message. The additional information corresponds to information related to the result of executing a corresponding application by using the word included in the text block 1121.

Therefore, the Map application of the receiving device 1120 may use the authority information for tracking the position (or location) of the transmitting device 1110, the authority information being included in the metadata, so as to be capable of inserting a map, which indicates a specific place where the transmitting device 1110 is currently located, in the text message.

The location of the transmitting device 1110 at the time when the text message is transmitted may be different from the location of the transmitting device 1110 at the time when the user of the receiving device 1120 views the additional information. Therefore, when the location of the transmitting device 1110 is changed, the additional information being provided from the transmitting device 1110 with respect to the text block 1111 (i.e., information on the location the transmitting device 1110) may be different from the additional information being provided from the receiving device 1120 with respect to the text block 1121 (i.e., information on the current location of the transmitting device 1110).

As described above, with respect to the same link information, in the digital device according to the present disclosure, different types of additional information may be inserted in the transmitting digital device and the receiving digital device. Most particularly, in the transmitting device, when the text message includes a word related to the location, information on the location of the transmitting device or authority information for tracking the location of the transmitting device may be included in the metadata. Respectively, in the receiving device, when the text message includes a word related to the location, information on the location of the transmitting device may be included in the text message as the additional information. However, when the metadata include the authority information for tracking the location of the transmitting device, the location information that is being inserted may correspond to information for tracking the current location of the transmitting device.

Figure 12:
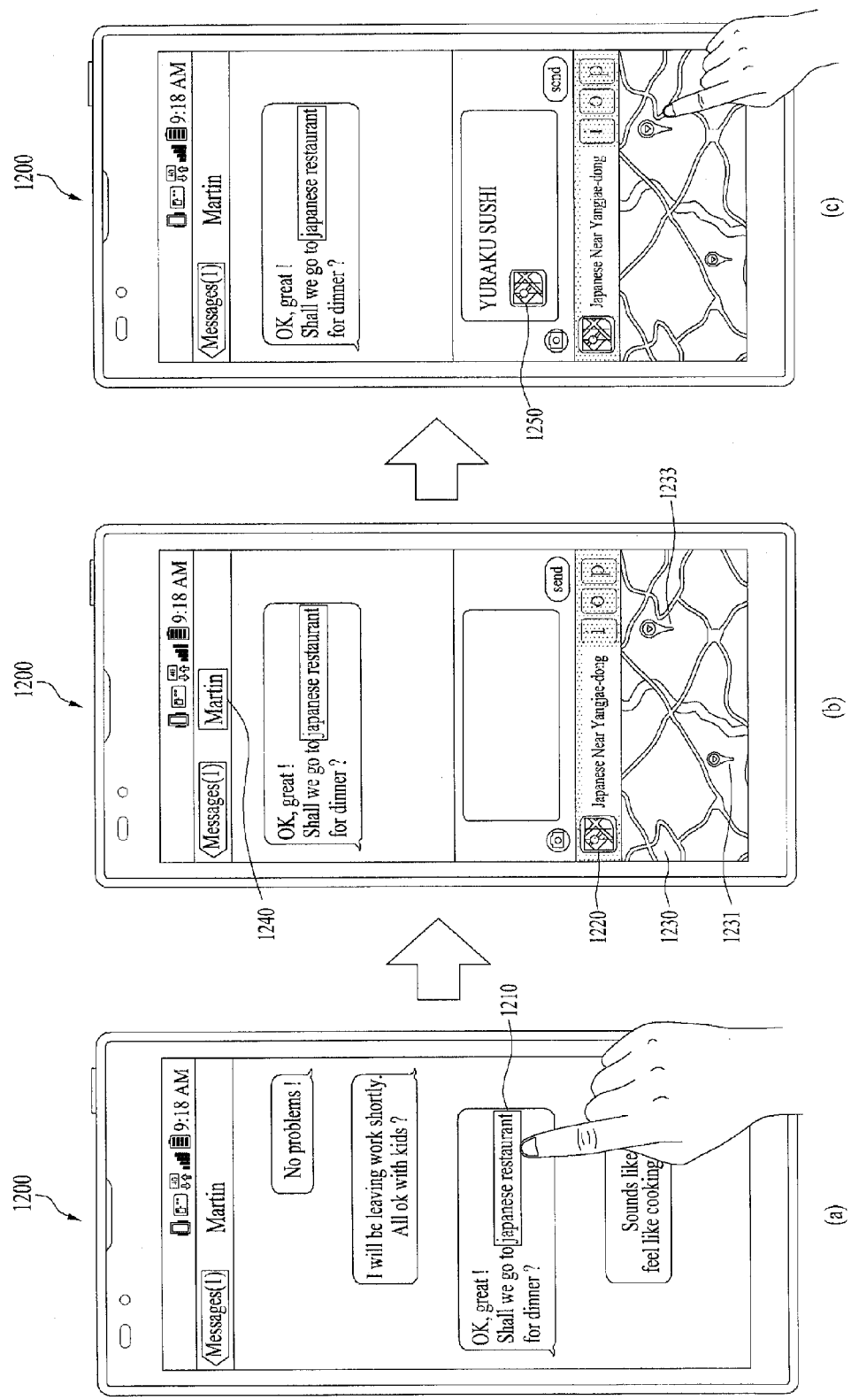
FIG. 12 illustrates an example of extracting an application, which provides additional information with respect to a text block in accordance with a corresponding priority level, according to the embodiment of the present disclosure.

Meanwhile, FIG. 12 illustrates an example of extracting an application, which provides additional information with respect to a text block in accordance with a corresponding priority level, according to the embodiment of the present disclosure.

The digital device 1200 may detect an input signal inputted by the user with respect to a text block 1210, as shown in (a) of FIG. 12. The display device 1200 may extract an application, which provides additional information on the text block 1210, as shown in (b) of FIG. 12.

At this point, the digital device 1200 may extract an application in accordance with a priority level, which is determined based upon at least one of transmission information and reception information related to the corresponding text message, history information of the text message, Social Network Service (SNS) usage information according to the transmission information or the reception information, and so on. Additionally, when providing the additional information by using the extracted application, the digital device 1200 may provide the additional information based upon at least one of the transmission information and reception information related to the corresponding text message, the history information of the text message, the Social Network Service (SNS) usage information according to the transmission information or the reception information, and so on.

Referring to FIG. 12, the digital device 1200 shall provide additional information associated with a 'Japanese restaurant', which is included in the text message 1210. By referring to the transmission information, the digital device 1200 analyzes 'Martin' 1240 from which (or whom) the message has been transmitted and also analyzes a message history. Then, the digital device 1200 recognizes that an application for providing location guidance was most frequently used with respect to the corresponding message. Thereafter, the digital device 1200 may first extract a Map application, which searches for a 'Japanese restaurant' within the surrounding area and provides location information on the searched 'Japanese restaurant'.

Additionally, with respect to the additional information that is provided by using the Map application, the digital device 120 may provide the location 1231 of the searched 'Japanese restaurant', which is located within the nearest range from the current location of the digital device 1200, as the additional information. Herein, however, the digital device 1200 may also select additional information, which provides guidance information on the location 1233 of a specific 'Japanese restaurant', which the user of the digital device 1200 had visited with 'Martin'. At this point, the location 1233 of the specific 'Japanese restaurant' may correspond to the location of a particular Japanese restaurant, which is most frequently searched and quoted from the SNS of transmitter 'Martin' 1240.

Therefore, the digital device 1200 may display an application interface, which includes an icon representing the Map application, and the digital device 1200 may also provide preview information 1230 for the additional information.

Respectively, when the user selects a wanted location by referring to the preview information 1230, as shown in (c) of FIG. 12, the digital device 1200 may insert the corresponding additional information 1250 in the text message according to an input signal corresponding to the user's selection.

Meanwhile, unlike the description presented above, (c) of FIG. 12 illustrates an exemplary case when the additional information is inserted in another message (e.g., a message that is currently being written (or composed)), instead of the text message including a text block. More specifically, the digital device 1200 according to the embodiment of the present disclosure may differently set up a message including a text block and a message having additional information inserted therein with respect to a text block.

Figure 13:
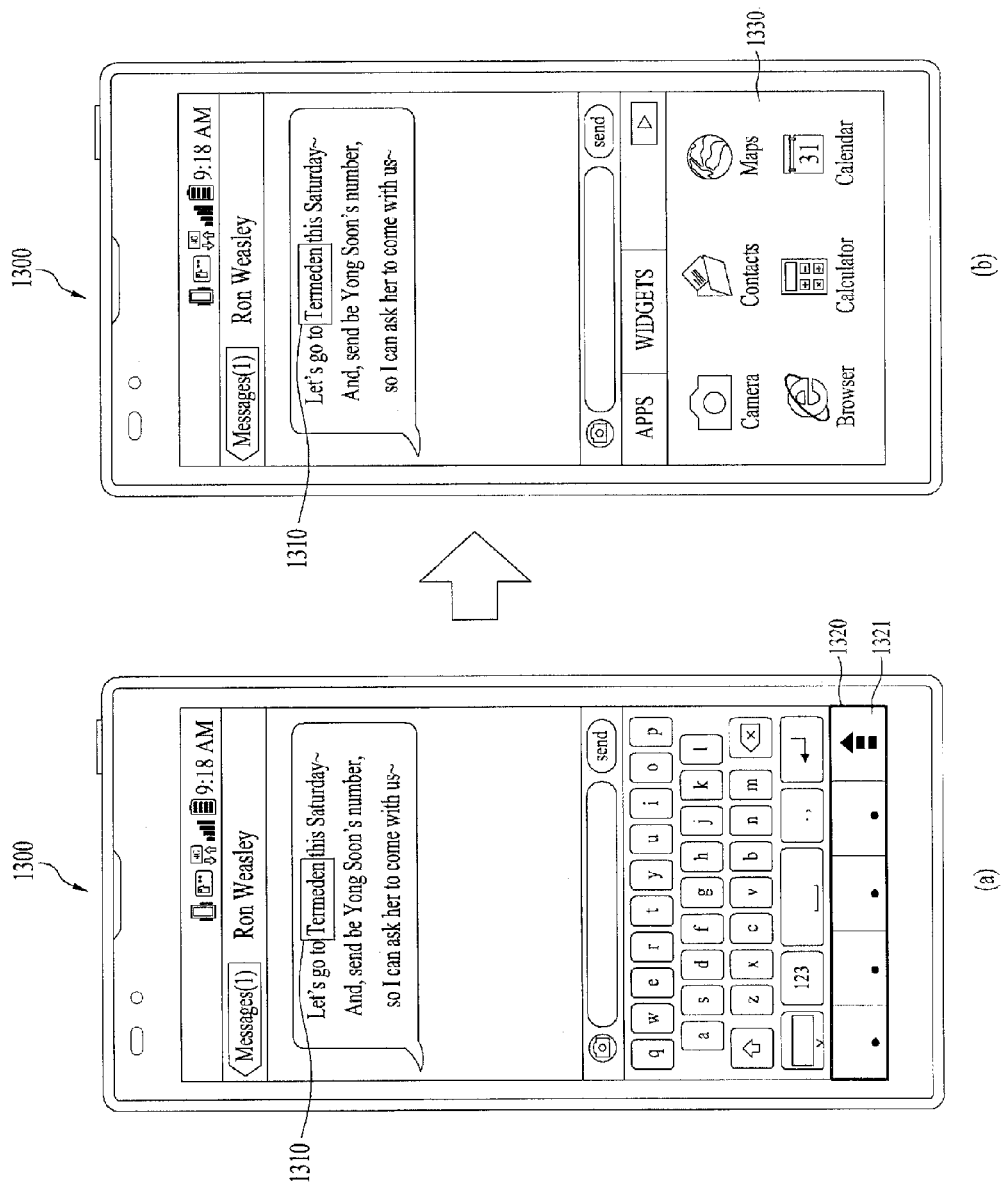
FIG. 13 illustrates an exemplary text messaging interface of a case when an application, which provides additional information with respect to a text block, is not extracted.

Meanwhile, FIG. 13 illustrates an exemplary text messaging interface of a case when an application, which provides additional information with respect to a text block, is not extracted.

Herein, the digital device 1300 may not be capable of extracting an application, which provides additional information with respect to at least one word included in a text block 1310. This is because an application having the word included in the text block 1310 as its execution condition (or requirement) may not exist.

At this point, as shown in (a) of FIG. 13, the digital device 1300 may display an application interface 1320 in a minimum area and may indicate that the extracted application does not exist. However, when the user selects an Enlarge Application Interface menu 1321, as shown in (b) of FIG. 13, the digital device 1300 may display a list of applications (or an application list), which is basically provided, in an application interface 1330. Thus, the digital device 1300 may provide the user with an environment enabling the user to select a wanted application.

Figure 14:
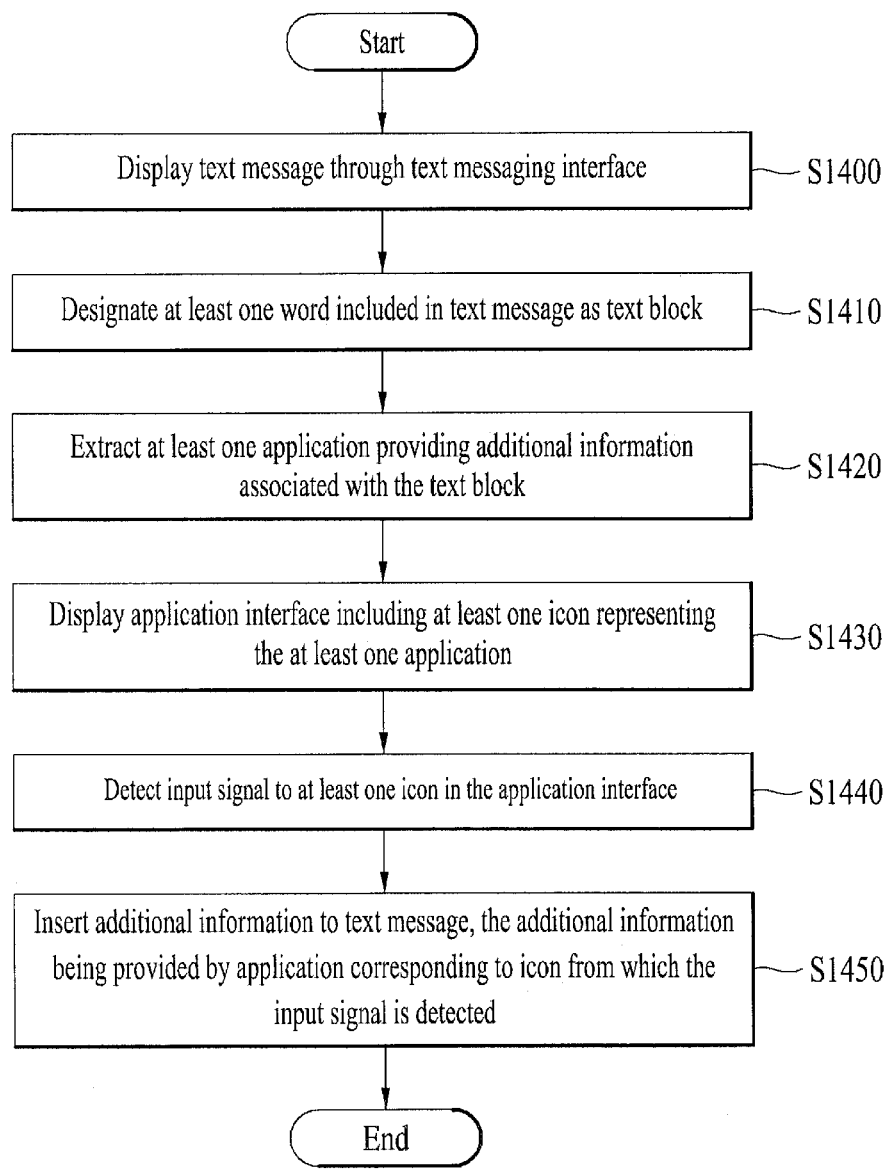
FIG. 14 illustrates a flow chart showing the process steps of a method for controlling a digital device according to an embodiment of the present disclosure.

FIG. 14 illustrates a flow chart showing the process steps of a method for controlling a digital device according to an embodiment of the present disclosure. FIG. 14 illustrates a method for controlling the digital device according to the embodiment of the present disclosure, when the digital device corresponds to a transmitting device transmitting a text message.

First of all, as described above with reference to FIG. 2, the digital device may display a text message through a text messaging interface (S1400).

As described above with reference to FIG. 3, the digital device may designate at least one word included in the text message in a text block form (S1410). Additionally, the digital device may add a graphic effect on the designated text block.

At this point, as described above with reference to FIG. 4, the digital device may detect an input signal inputted by the user with respect to the at least one word included in the text message. Then, the digital device may designate the at least one word having the input signal detected therefrom in a text block form.

Alternatively, as described above with reference to FIG. 6, the digital device may extract at least one keyword from the text message. And, then, the digital device may designate the at least one extracted keyword in at least one block form.

As described above with reference to FIG. 4 to FIG. 6 and FIG. 12, the digital device may extract at least one application providing additional information associated with the text block (S1420). The additional information may correspond to information related to a result of executing an application (or application execution result) by using at least one word included in the text block.

As described above with reference to FIG. 4 to FIG. 6 and FIG. 12, the digital device may display an application interface including at least one icon representing the extracted application (S1430).

As described above with reference to FIG. 4 and FIG. 7, when the digital device detects the input signal to the icon included in the application interface (S1440), the digital device may insert additional information, which is provided by the application corresponding to the icon having the input signal detected therefrom, in the text message (S1450).

As described above, the icon being provided by the application interface may have an additional function. When the input signal to the icon is detected, the icon being provided by the application interface may execute a function of executing the corresponding application and switching (or changing)

the display screen to an application execution screen. Moreover, when the display device detects the signal to the icon, the icon being provided by the application interface may also perform a function of additionally executing the corresponding application via multi-tasking without switching (or changing) the display screen and internally executing the application. Accordingly, the icon being provided by the application interface may perform a function of acquiring additional information from the internally executed application and inserting the acquired information in the text message.

Additionally, as described above with reference to FIG. 7, the digital device may insert the additional information and delete the text block. More specifically, the digital device may replace the text block with the additional information.

Furthermore, after the digital device has inserted the additional information, or at the same time the digital device inserts the additional information, the digital device may generate metadata for transmitting the text message to a receiving device. The metadata may include application information providing additional information on the text block, additional information being provided by the corresponding application, and link information on the additional information.

Figure 15:
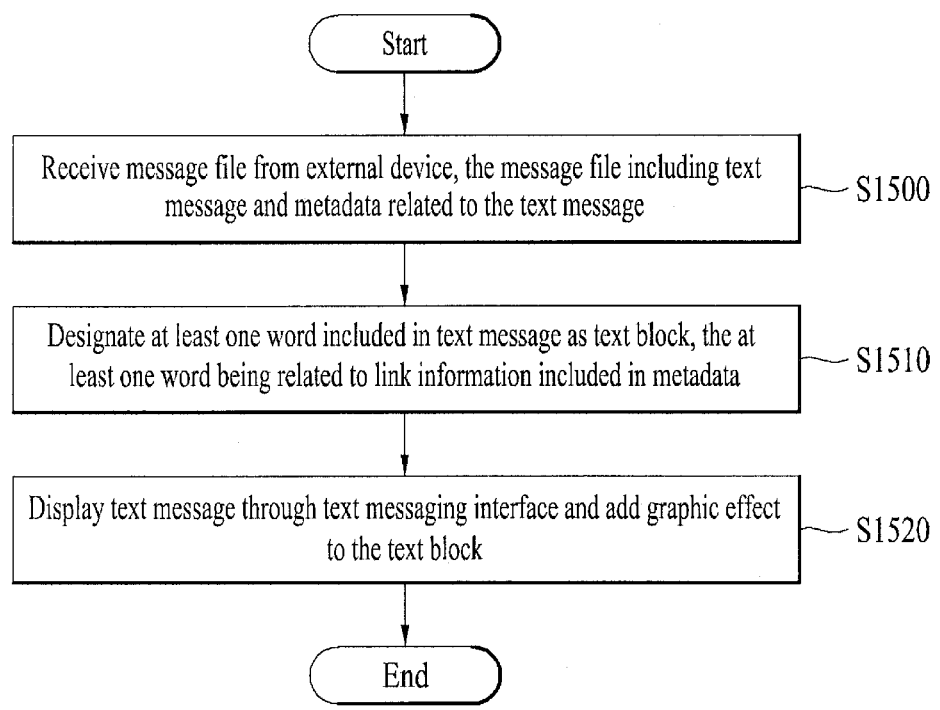
FIG. 15 illustrates a flow chart showing the process steps of a method for controlling a digital device according to another embodiment of the present disclosure.

Meanwhile, FIG. 15 illustrates a flow chart showing the process steps of a method for controlling a digital device according to another embodiment of the present disclosure. FIG. 15 illustrates a method for controlling the digital device according to the embodiment of the present disclosure, when the digital device corresponds to a receiving device receiving a text message.

First of all, as described above with reference to FIG. 11, the digital device may receive a message file including a text message and metadata related to the text message from an external device (S1500).

As described above with reference to FIG. 11, the digital device may designate at least one word included in the text message in a text block form (S1510). Herein, the at least one word is related to the link information included in the metadata. The link information may include at least one of application information for executing an application related with a text block, execution information of the application (or application execution information), and Uniform Resource Locator (URL) information from which the application can be downloaded.

As described above with reference to FIG. 11, the digital device may display a text message through a text messaging interface and may add a graphic effect to the designated text block (S1520).

As described above with reference to FIG. 11, when the display device detects an input signal to the text block, the digital device may extract an application according to the link information and may display application information including at least one icon representing the extracted application.

Additionally, when the digital device detects an input signal to at least one icon, which is included in the application interface, the digital device may insert additional information, which is being provided by the application corresponding to the icon from which the input signal is detected, in the text message.

Moreover, by using the link information, the digital device may link the text block with the additional information associated with the text block, thereby setting up the text block as a hypertext.

Finally, as described above with reference to FIG. 7 and FIG. 12, before inserting the additional information, the digital device may display preview information on the additional information, and, when the digital device detects an input signal to the displayed preview information, the digital device may insert the additional information to the text message.

Furthermore, although the drawings have been distinguished and divided in order to facilitate the description of the present disclosure, the present disclosure may be designed to form a new embodiment by combining some of the above-described embodiments of the present disclosure. Moreover, whenever required by anyone skilled in the art, the scope of the present disclosure includes designing a recording medium readable by a computer, the computer having a program for executing the above-described embodiments of the present disclosure recorded therein.

The digital device and the method for controlling the same according to the present disclosure may not be limited only to the above-described configuration and methods according to the exemplary embodiments of the present disclosure. Accordingly, variations of the exemplary embodiments of the present disclosure may be configured by selectively combining each exemplary embodiment of the present disclosure fully or in part.

Meanwhile, the method for controlling a digital device according to the present disclosure may be realized as a code that can be read by a processor provided in the image display device in a recording medium that can be read by a processor. The recording medium that can be read by the processor includes all types of recording devices storing data that can be read by the processor. Examples of the recording media that can be read by a processor may include ROMs, RAMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

As described above, the digital device and the method for controlling the same may have the following advantages. According to the embodiment of the present disclosure, since additional information related to a text message can be inserted in a text messaging interface, the user's convenience may be enhanced. More specifically, in order to insert the additional information to the text message, the user may execute a separate application and may then directly insert the additional information within the text messaging interface, without having to execute the text messaging interface once again.

According to another embodiment of the present disclosure, apart from a text that is personally (or manually) designated by the user, additional information associated with a keyword, which is automatically extracted by the digital device, may also be inserted in the text message, thereby reducing inconvenience of the user. Additionally, according to yet another embodiment of the present disclosure, by inserting additional information based upon a correlation between a transmitter and a receiver of the corresponding text message, the text messaging interface according to the embodiment of the present disclosure may insert additional information best-fitting the intentions of the user.

Moreover, according to yet another embodiment of the present disclosure, by inserting additional information in a text message that is currently being written (or composed) by the user as well as in an already-received message, the applicability of the present disclosure may be extended. More specifically, by providing an interface enabling the user to edit a received message, the present disclosure may provide a memo function with respect to the corresponding text message.

Furthermore, according to yet another embodiment of the present disclosure, even if the same link information is added to the additional information, which is to be inserted in the text message, the digital device according to the present disclosure may provide a text messaging interface inserting different additional information to each of a transmitting device and a receiving device.

Finally, according to a further embodiment of the present disclosure, when the digital device according to the present disclosure provides additional information in accordance with the user's input, the additional information may vary depending upon the time point at which the additional information is provided. For example, when location information is provided as the additional information, the digital device may provide information on a current location of the device at a specific time point when the user has requested for the additional information.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents. It is also apparent that such variations of the present disclosure are not to be understood individually or separately from the technical scope or spirit of the present disclosure.

Also, a device and a method for controlling the device are both described in this specification of the present disclosure. Therefore, whenever required, the description of both may be supplementarily applied.

What is claimed is:

1. A digital device providing a text messaging service, comprising:
    a display unit configured to display a text messaging interface;
    a sensor unit configured to sense a user input inputted to the digital device and delivering a signal according to a sensed result to a processor;
    a communication unit configured to transmit and receive text messages to and from an external device; and
    the processor configured to control the display unit, the sensor unit, and the communication unit,
    wherein the processor:
    designates at least one word included in the text message as a text block, wherein the text message is displayed through the text messaging interface,
    extracts at least one application providing additional information associated with the text block,
    controls the display unit to display an application interface including at least one icon representing the at least one application, wherein the application interface is overlaid on a portion of the text messaging interface,
    detects a first input signal to the at least one icon in the application interface,
    when the first input signal is detected, displays preview information of the additional information, wherein the preview information is overlaid on a portion of the text messaging interface, and
    when a second input signal to the preview information is detected, inserts the additional information to the text message, wherein the additional information is provided by an application corresponding to an icon from which the first input signal is detected.

2. The digital device of claim 1, wherein the processor detects a third input signal to at least one word included in the text message and designates the at least one word, from which the third input signal is detected, as a text block.

3. The digital device of claim 1, wherein the processor extracts at least one keyword from the text message and designates the at least one keyword as at least one text block.

4. The digital device of claim 1, wherein the processor adds a graphic effect to the text block.

5. The digital device of claim 1, wherein the processor extracts the at least one application according to a priority level, and wherein the priority level is decided by using at least one of transmission information and reception information related to the text message, history information of the text message, and Social Network Service (SNS) usage information related to the transmission information or the reception information.

6. The digital device of claim 1, wherein the processor displays the application interface in a surrounding area of the text message.

7. The digital device of claim 1, wherein, when a third input signal is detected, the processor hides the application interface, and wherein, when a fourth input signal is detected, the processor displays the hidden application interface.

8. The digital device of claim 1, wherein the additional information includes information related to an execution result of an application, wherein the application is executed by using the at least one word included in the text block.

9. The digital device of claim 1, wherein, when the additional information is inserted in the text message, the processor deletes the text block related to the additional information.

10. The digital device of claim 9, wherein the processor inserts the additional information in a location of the text block that is to be deleted.

11. The digital device of claim 1, wherein the processor generates metadata for transmitting the text message to the external device, and
    wherein the metadata include at least one of at least one word included in the text block, additional information associated with the text block, application information providing the additional information, and link information to the additional information.

12. The digital device of claim 11, wherein the metadata further includes at least one of location information of the digital device and authority information for tracking a location of the digital device.

13. A digital device providing a text messaging service, comprising:
    a display unit configured to display a text messaging interface;
    a sensor unit configured to sense a user input inputted to the digital device and delivering an input signal according to a sensed result to a processor;
    a communication unit configured to transmit and receive data to and from an external device; and
    the processor configured to control the display unit, the sensor unit, and the communication unit,
    wherein the processor:
    receives a message file including a text message and metadata related to the text message from the external device, wherein the metadata include link information for providing additional information associated with at least one word included in the text message,
    designates the at least one word as a text block, wherein the at least one word is related to the link information,
    displays the text message through the text messaging interface, adds a graphic effect to the text block,
in response to a first input signal corresponding to the text block, extracts at least one application according to the link information,
controls the display unit to display an application interface including at least one icon representing the at least one application, wherein the application interface is overlaid on a portion of the text messaging interface,
detects a second input signal to an icon in the application interface,
when the second input signal is detected, displays preview information of the additional information, wherein the preview information is overlaid on a portion of the text messaging interface, and
when a third input signal to the preview information is detected, inserts the additional information provided by an application to the text message, wherein the application corresponds to the icon from which the second input signal is detected.

14. The digital device of claim 13, wherein the additional information includes information related to an execution result of an application, wherein the application is executed by using at least one word included in the text block.

15. The digital device of claim 13, wherein the processor designates the text block as a hypertext by connecting the text block with the link information.

16. The digital device of claim 13, wherein the processor inserts the additional information in a location of a text block associated with the additional information and deletes the text block.

17. The digital device of claim 13, wherein the metadata further include at least one of location information of the external device transmitting the message file and authority information for tracking a location of the external device.

18. The digital device of claim 17, wherein, when a word related to a location is designated as a text block, the processor inserts location information of the external device in the text message by using the metadata, and
wherein, when the metadata include authority information for tracking the location of the external device, the location information of the external device corresponds to information on a currently tracked location of the external device.

19. The digital device of claim 18, wherein the processor inserts location information of the external device in a location of the word designated as the text block and deletes the word designated as the text block.

20. A method for controlling a digital device providing a text messaging service, comprising:
displaying a text message through a text messaging interface;
designating at least one word included in the text message as a text block, wherein the text message is displayed through the text messaging interface;
extracting at least one application providing additional information associated with the text block;
displaying an application interface including at least one icon representing the at least one application, wherein the application interface is overlaid on a portion of the text messaging interface;
detecting a first input signal to the at least one icon in the application interface;
inserting additional information to the text message, wherein the additional information is provided by an application corresponding to an icon from which the first input signal is detected;
when the first input signal is detected, displaying preview information of the additional information, wherein the preview information is overlaid on a portion of the text messaging interface; and
when a second input signal to the preview information is detected, inserting the additional information to the text message, wherein the additional information is provided by an application corresponding to an icon from which the first input signal is detected.

21. A method for controlling a digital device providing a text messaging service, comprising:
receiving a message file including a text message and metadata related to the text message from an external device, wherein the metadata include link information for providing additional information associated with at least one word included in the text message;
designating the at least one word as a text block, wherein the at least one word is related to the link information;
displaying the text message through the text messaging interface,
wherein, in the step of displaying the text message, a graphic effect is added to the text block;
in response to a first input signal corresponding to the text block, extracting at least one application according to the link information;
displaying an application interface including at least one icon representing the at least one application, wherein the application interface is overlaid on a portion of the text messaging interface;
detecting a second input signal to an icon in the application interface;
when the second input signal is detected, displaying preview information of the additional information, wherein the preview information is overlaid on a portion of the text messaging interface; and
when a third input signal to the preview information is detected, inserting the additional information provided by an application to the text message, wherein the application corresponds to the icon from which the second input signal is detected.

* * * * *